United States Patent
Ashizawa et al.

(10) Patent No.: US 9,725,612 B2
(45) Date of Patent: Aug. 8, 2017

(54) METHOD FOR MANUFACTURING WATER-BASED INK FOR INKJET RECORDING

(71) Applicant: KAO CORPORATION, Tokyo (JP)

(72) Inventors: Takeshi Ashizawa, Barcelona (ES); Teruyuki Fukuda, Wakayama (JP); Satoshi Tanaka, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 14/392,279

(22) PCT Filed: Jun. 24, 2014

(86) PCT No.: PCT/JP2014/066697
§ 371 (c)(1),
(2) Date: Dec. 24, 2015

(87) PCT Pub. No.: WO2014/208548
PCT Pub. Date: Dec. 31, 2014

(65) Prior Publication Data
US 2016/0297981 A1    Oct. 13, 2016

(30) Foreign Application Priority Data

Jun. 25, 2013 (JP) ................. 2013-132658

(51) Int. Cl.
| | |
|---|---|
| *C09D 11/38* | (2014.01) |
| *C09D 11/107* | (2014.01) |
| *C09D 11/033* | (2014.01) |
| *B41J 2/04* | (2006.01) |
| *C09D 11/322* | (2014.01) |

(52) U.S. Cl.
CPC ............ *C09D 11/38* (2013.01); *C09D 11/033* (2013.01); *C09D 11/107* (2013.01); *C09D 11/322* (2013.01)

(58) Field of Classification Search
None
See application file for complete search history.

(56) References Cited

U.S. PATENT DOCUMENTS

| | | |
|---|---|---|
| 5,938,829 A | 8/1999 | Higashiyama et al. |
| 2003/0103121 A1 | 6/2003 | Tomioka et al. |
| 2007/0232723 A1 | 10/2007 | Arakawa |
| 2009/0124739 A1 | 5/2009 | Matsumoto et al. |
| 2011/0076404 A1 | 3/2011 | Brust et al. |
| 2011/0234683 A1 | 9/2011 | Komatsu |
| 2011/0257309 A1 | 10/2011 | Yoshida et al. |
| 2011/0263752 A1 | 10/2011 | Hiraishi et al. |
| 2012/0219715 A1 | 8/2012 | Yoshida et al. |
| 2014/0063155 A2 | 3/2014 | Wakabayashi et al. |

FOREIGN PATENT DOCUMENTS

| | | |
|---|---|---|
| JP | 9-255904 A | 9/1997 |
| JP | 2003-39812 A | 2/2003 |
| JP | 2003-138175 A | 5/2003 |
| JP | 2004-217736 A | 8/2004 |
| JP | 2007-92059 A | 4/2007 |
| JP | 2007-262326 A | 10/2007 |
| JP | 2008-69355 A | 3/2008 |
| JP | 2011-94075 A | 5/2011 |
| JP | 2011-99039 A | 5/2011 |
| JP | 2011-144348 A | 7/2011 |
| JP | 2011-201063 A | 10/2011 |
| JP | 2011-245670 A | 12/2011 |
| JP | 2012-67265 A | 4/2012 |
| JP | 2012-167222 A | 9/2012 |
| JP | 2013-506730 A | 2/2013 |
| WO | WO 2009/035944 A2 | 3/2009 |
| WO | WO 2011/021665 A1 | 2/2011 |

OTHER PUBLICATIONS

International Search Report, issued in PCT/JP2014/066697, dated Oct. 14, 2014.

*Primary Examiner* — An Do
*Assistant Examiner* — Renee I Wilson
(74) *Attorney, Agent, or Firm* — Birch, Stewart, Kolasch & Birch, LLP

(57) ABSTRACT

The present invention relates to a process for producing a water-based ink for ink-jet printing, including the step of dispersing a pigment in a polymer by means of a disperser using dispersing media particles containing a zirconium compound to introduce the solid zirconium compound into the water-based ink, the water-based ink including the pigment-containing polymer particles and the solid zirconium compound, and having a zirconium compound content of not less than 2 ppm and not more than 200 ppm in terms of a concentration of zirconium in the water-based ink.

19 Claims, No Drawings

METHOD FOR MANUFACTURING WATER-BASED INK FOR INKJET RECORDING

FIELD OF THE INVENTION

The present invention relates to a process for producing a water-based ink for ink-jet printing.

BACKGROUND OF THE INVENTION

In ink-jet printing methods, small droplets of ink are allowed to fly onto a recording medium such as paper from fine nozzles and adhere to the recording medium, to form images or characters thereon. The ink-jet printing methods have becomes rapidly spread because of various advantages such as easiness of full coloration, low cost, non-contact with printed images or characters, etc.

In the ink-jet printing methods, although various advantages as described above are attained, the following problem tends to occur owing to the use of water as a main solvent for the ink for ink-jet printing. That is, when the water is contacted with a surface of an inside material of an ink-jet printer, in particular, a metal or ceramic material, etc., which is disposed at portions that tend to come into contact with the ink, the material tends to be oxidized so that metal ions or silicon ions contained therein tend to be eluted out in the ink, thereby causing such a problem that corrosion of the material gradually proceeds.

For example, WO 2009/035944A discloses an inkjet ink to be filled in a print head having a silicon dicing structure, in which by using a basic ink containing a trivalent metal ion, a metal ion-silicate complex is formed on a surface of silicon constituting the print head to thereby suppress elution of silica into the ink.

JP 2007-262326A discloses an aqueous pigment ink composition that includes a block polymer constituted of at least one hydrophilic block and at least one hydrophobic block and has a total metal content of not more than 100 ppm on the basis of the pigment, and is capable of satisfying not only color saturation and color density upon printing but also color image fastness.

JP 2008-69355A discloses an aqueous ink including a dispersion containing a pigment that is incorporated in a polymer to thereby render the pigment dispersible in water, and having a total polyvalent metal ion content of not more than 200 ppm, in which the ink causes less bleeding on a plain paper with a high color development, and exhibits not only sufficient color development but also good fixing property as well as excellent ejection property on an exclusive paper.

JP 2013-506730A discloses an ink composition including a pigment and an anionic charged polymer, and further including a dispersion of particles of an oxide of a polyvalent metal such as zirconium at a lower concentration than that of the pigment or anionic charged polymer, in which the pH of the ink composition is more than 4, and the polyvalent metal oxide particles have a negative zeta potential at the pH of the ink composition, and which is capable of providing an ink formulation having a higher polyvalent metal concentration.

JP 2004-217736A discloses an ink set constituted of at least one first ink including at least a first anionic or cationic colorant and fine particles of zirconia, etc., and at least one second ink including at least a second colorant having a reverse polarity to that of the first colorant, which has a high optical density and can produce images having a high printing quality without occurrence of bleeding.

JP 2003-138175A discloses a process for producing a dispersion ink for ink-jet printing using a wet stirred media mill and dispersing beads having a number of surface desorption of not more than 40 in which the ink is free from contamination with the beads and excellent in ejection property when used as an ink for ink-jet printing. In JP 2003-138175A, zirconia beads are illustrated as the dispersing beads.

However, the inks disclosed in WO 2009/035944A and JP 2008-69355A contain the metals only in an ionic state. If the inks are used as an ink for ink-jet printing, it is not possible to attain a sufficient effect of suppressing corrosion of inside materials of a printer which come into contact with the inks, for example, such as a print head, for a long period of time. The ink disclosed in JP 2007-262326A is characterized by a less content of metals therein. However, if the ink contains the metals only in an ionic state, it is also not possible to attain a sufficient corrosion suppressing effect for a long period of time.

SUMMARY OF THE INVENTION

The present invention relates to the following aspects [1] to [6].

[1] A process for producing a water-based ink for ink-jet printing, including the step of dispersing a pigment in a polymer by means of a disperser using dispersing media particles containing a zirconium compound to introduce the solid zirconium compound into the water-based ink, the water-based ink including the pigment-containing polymer particles and the solid zirconium compound, and having a zirconium compound content of not less than 2 ppm and not more than 200 ppm in terms of a concentration of zirconium in the water-based ink.

[2] An image forming method including the step of using the water-based ink for ink-jet printing produced by the process according to the above aspect [1] in an ink-jet printer including a print head an inside portion of which is made of an inorganic material to form images.

[3] A method of storing a water-based ink for ink-jet printing, including the step of storing the water-based ink for ink-jet printing produced by the process according to the above aspect [1] in an apparatus an inside portion of which is made of an inorganic material.

[4] A method of preventing corrosion of an inorganic material, using the water-based ink for ink-jet printing produced by the process according to the above aspect [1].

[5] The method according to any one of the aspects [2] to [4], wherein the inorganic material includes silicon nitride.

[6] A use of the water-based ink for ink-jet printing produced by the process according to the above aspect [1] for forming images by an ink-jet printing method.

DETAILED DESCRIPTION OF THE INVENTION

The present invention relates to a process for producing a water-based ink for ink-jet printing including pigment-containing polymer particles and a solid zirconium compound, as well as an image forming method using the water-based ink for ink-jet printing produced by the process, a method of storing the water-based ink, a method of preventing corrosion of an inorganic material using the water-based ink and a use of the water-based ink for forming images.

The present invention provides a process for producing a water-based ink for ink-jet printing which is excellent in effect of suppressing corrosion of inside materials of an ink-jet printer which come into contact with the ink, for a long period of time.

The present inventors have found that the aforementioned conventional problems are solved by dispersing a pigment in a polymer by means of a disperser using dispersing media particles containing a zirconium compound to incorporate a specific amount of the zirconium compound in a specific form into the water-based ink for ink-jet printing.

The water-based ink for ink-jet printing obtained by the production process of the present invention has an excellent effect of suppressing corrosion of inside materials of an ink-jet printer such as a print head, for a long period of time, and therefore can be suitably used in an ink-jet printer with high economy.

[Process for Producing Water-Based Ink for Ink-Jet Printing]

The process for producing a water-based for ink-jet printing according to the present invention (hereinafter also referred to as a "production process of the present invention") includes the step of dispersing a pigment in a polymer by means of a disperser using dispersing media particles containing a zirconium compound to introduce the solid zirconium compound into the water-based ink (hereinafter also referred to as a "zirconium compound introduction step"), and is thus characterized by producing the water-based ink including the pigment-containing polymer particles and a specific amount of the solid zirconium compound. The water-based ink for ink-jet printing obtained by the production process of the present invention has an excellent effect of suppressing corrosion of inside materials of a printer which come into contact with the ink, for a long period of time, owing to inclusion of the solid zirconium compound therein. The reason why the water-based ink for ink-jet printing obtained by the production process of the present invention exhibits the above effect is considered as follows.

That is, as the materials that come into contact with the ink among the materials disposed inside an ink-jet printer, there may be mentioned a print head and the like. An inside portion of the print head is generally made of an inorganic material such as metals and ceramic materials. The metals and ceramic materials tend to be oxidized by contact with water as a main solvent of the water-based ink. Therefore, as the oxidation reaction proceeds, metal ions or silicon ions tend to be eluted from these materials into the water-based ink, so that corrosion of the inside portion of the print head tends to gradually proceed The zirconium ions as polyvalent metal ions are capable of forming a composite metal salt with a metal compound contained in the metals or ceramic materials. For this reason, it is considered that by incorporating the zirconium compound into the water-based ink, it is possible to suppress oxidation of a surface of the respective materials such as the print head or the like which tends to be caused by contact with water, and therefore prevent corrosion of these materials. In addition, it is considered that by incorporating the zirconium compound in a solid state into the water-based ink, even though the composite metal salt is desorbed from the surface of the respective materials, additional zirconium ions are freshly supplied into the ink, so that the corrosion suppressing effect can be exhibited for a long period of time. Further, it is considered that by incorporating the solid zirconium compound into the water-based ink in the step of dispersing the pigment in the polymer, a certain good effect of dispersing even the zirconium compound having a large specific gravity such as zirconia can be attained, so that the corrosion suppressing effect can be continuously exhibited for a long period of time. On the other hand, the water-based ink containing the zirconium compound only in an ionic state is incapable of continuously exhibiting the corrosion suppressing effect for a long period of time.

Among the inorganic materials such as metals and ceramic materials, the ceramic materials tend to suffer from promoted oxidation reaction by the presence of water. In particular, the ceramic materials containing a silicon-containing compound is more likely to suffer from oxidation by contact with water and cause elution of silicon ions therefrom. Therefore, the corrosion suppressing effect attained by using the water-based ink obtained by the production process of the present invention can be more remarkably exhibited against such ceramic materials.

Among the silicon-containing compounds, silicon nitride not only tends to undergo oxidation reaction with water and suffer from elution of silicon ions therefrom, but also tends to produce ammonia from nitrogen generated in a side reaction thereof. If an alkali compound such as ammonia is present upon molding the ceramic materials, a sintering agent used upon the molding tends to be damaged, so that corrosion of the ceramic materials tend to further proceed. Thus, the materials containing silicon nitride tend to suffer from accelerated corrosion when contracted with the conventional water-based inks. However, by using the water-based ink obtained by the production process of the present invention, it is possible to prevent these materials from suffering from the corrosion.

As described above, the water based ink obtained by the production process of the present invention can be suitably used in an ink-jet printer including a print head made of the aforementioned materials, etc.

(Dispersing Media Particles)

The production process of the present invention includes the step of dispersing a pigment in a polymer by means of a disperser using dispersing media particles containing a zirconium compound, so that the solid zirconium compound in the form of an abraded powder generated from the dispersing media particles is introduced into the water-based ink.

The dispersing media particles used in the present invention are not particularly limited as long as they contain a zirconium compound. From the viewpoint of efficiently introducing the zirconium compound into the water-based ink, the dispersing media particles formed of a zirconium compound may be suitably used.

The zirconium compound as used in the present invention means a compound containing a zirconium atom. Examples of the zirconium compound include at least one compound selected from the group consisting of zirconium, zirconia, zircon and a solid solution of any of these compounds with calcium oxide, magnesium oxide or a rare earth oxide such as yttrium oxide. Of these compounds, from the viewpoint of good hardness of the dispersing media particles, preferred is at least one compound selected from the group consisting of zirconia and zircon, and more preferred is zirconia. The aforementioned zirconium compounds may be used alone or in combination of any two or more thereof.

As the dispersing media particles used in the present invention, there may be mentioned dispersing media particles produced by granulation method in which fine particles of the material constituting the dispersing media particles are granulated, and dispersing media particles produced by plasma melting method, etc. Of these particles, from the viewpoint of incorporating a predetermined amount of the solid zirconium compound into the water-based ink, preferred are the dispersing media particles produced by granulation method.

The particle size of the dispersing media particles is preferably not less than 10 μm and not more than 500 μm, and more preferably not less than 10 μm and not more than 200 μm, from the viewpoints of attaining good pulverizability of materials to be pulverized and incorporating a predetermined amount of the solid zirconium compound into the water-based ink.

In the present invention, from the viewpoint of incorporating a predetermined amount of the solid zirconium compound into the water-based ink, it is preferable to use the dispersing media particles abraded to a certain extent by use. For example, the abraded dispersing media particles that are produced by granulation method in which fine particles of the material constituting the dispersing media particles are granulated, contain a large amount of the fine particles desorbed from the dispersing media particles as compared to unused dispersing media particles. For this reason, by conducting the dispersing procedure using the abraded dispersing media particles, it is possible to incorporate a larger amount of the zirconium compound in a solid state into the water-based ink.

The preferred degree of abrasion of the dispersing media particles used in the present invention is determined by a use history of the dispersing media particles as follows. That is, the use history of the dispersing media particles is controlled such that the cumulative net power as measured by operating the disperser packed with the dispersing media particles is preferably not less than 1500 kwh/kg, more preferably not less than 1750 kwh/kg, even more preferably not less than 1900 kwh/kg, and further even more preferably not less than 2100 kwh/kg. From the viewpoint of attaining good pulverizability of materials to be pulverized such as pigments, the cumulative net power is preferably not more than 10000 kwh/kg, more preferably not more than 5000 kwh/kg, and even more preferably not more than 3000 kwh/kg.

The "cumulative net power" as used herein which is measured by operating the disperser packed with the dispersing media particles means the value obtained by multiplying a net power [kw] by a cumulative operating time [h]. The "net power" as used herein means a power obtained by subtracting an idle running power from an actual loading power applied to the disperser that is operated with the dispersing media particles packed therein, whereas the "idle running power" as used herein means an operating power of the disperser required for operating the disperser under the condition that neither dispersing media particles nor materials to be dispersed are used therein.

(Disperser)

The disperser used in the zirconium compound introduction step in the production process of the present invention is not particularly limited as long as the dispersing media particles can be used therein. Examples of the disperser include media dispersers such as a ball mill, a sand mill and a beads mill. Of these dispersers, a beads mill is preferred from the viewpoint of high dispersion treatment efficiency.

The content of the zirconium compound in the water-based ink for ink-jet printing obtained by the production process of the present invention is not less than 2 ppm, preferably not less than 3 ppm, more preferably not less than 5 ppm, even more preferably not less than 10 ppm, further even more preferably not less than 20 ppm, and further even more preferably not less than 40 ppm, in terms of a concentration of zirconium in the water-based ink, from the viewpoint of suppressing corrosion of inside materials of a printer which come into contact with the ink, for a long period of time. Also, from the viewpoints of suppressing occurrence of clogging in the filtration step of the ink to thereby enhance productivity of the ink, and attaining a high corrosion suppressing effect per the zirconium compound content, the content of the zirconium compound in the water-based ink for ink-jet printing is not more than 200 ppm, preferably not more than 170 ppm, more preferably not more than 150 ppm, even more preferably not more than 80 ppm, and further even more preferably not more than 60 ppm, in terms of a concentration of zirconium in the water-based ink. The concentration of zirconium in the water-based ink may be measured by ICP (inductively coupled plasma) emission spectrometry, etc., more specifically may be measured by the method described in Examples below.

The particle size of the solid zirconium compound contained in the water-based ink for ink-jet printing obtained by the production process of the present invention is preferably not more than 2.0 μm, more preferably not more than 1.5 μm, and even more preferably not more than 1.2 μm, from the viewpoint of suppressing deposition of the solid zirconium compound inside an ink-jet printer used, an ink tank used, etc. Meanwhile, in the present invention, the particle size of the solid zirconium compound contained in the water-based ink is regarded as being not larger than a pore diameter of a filter used upon filtration of the water-based ink. More specifically, the particle size of the solid zirconium compound contained in the water-based ink is preferably such a particle size that allows the solid zirconium compound to pass through a filter having a pore diameter of 1.2 μm.

Meanwhile, the presence or absence of the solid zirconium compound in the water-based ink for ink-jet printing may be determined by the following method.

That is, 800 mL of the water-based ink is filled in a non-porous wall basket-type centrifugal separator ("himac CR7" available from Hitachi Koki Co., Ltd.; radius: 11.2 cm; capacity: 1,000 mL), and subjected to centrifugal separation at a temperature set to 20° C. at a rotating speed of 2300 rpm (1500 G) for 10 min. Thereafter, a supernatant solution is withdrawn from a portion of a centrifuge tube located 2 cm below an upper end thereof, whereas a bottom liquid is withdrawn from a portion of the centrifuge tube located 2 cm above a bottom end thereof, and the thus withdrawn supernatant solution and bottom liquid were respectively subjected to ICP (inductively coupled plasma) emission spectrometry. It is considered that the solid zirconium compound thus subjected to centrifugal separation is present in a larger amount in the centrifuge tube bottom liquid than in the supernatant solution, whereas zirconium ions are uniformly present in both of the supernatant solution and the centrifuge tube bottom liquid. Therefore, in the present invention, there is given such a definition that when the difference between amounts of a zirconium element in the supernatant solution and the centrifuge tube bottom liquid is not less than 20%, the zirconium compound contained in the water-based ink is present in a solid state. More specifically, the presence or absence of the solid zirconium compound in the water-based ink may be determined by the method described in Examples below.

(Pigment)

In the water-based ink for ink-jet printing obtained by the production process of the present invention, from the viewpoint of enhancing a water resistance and a weathering resistance of printed images or characters, the pigment is used as a colorant thereof. The pigment may be either an inorganic pigment or an organic pigment and may also be used in combination with an extender pigment, if required.

Examples of the inorganic pigment include carbon blacks and metal oxides. In particular, carbon blacks are preferably used for black water-based inks. The carbon blacks may include furnace blacks, thermal lamp blacks, acetylene blacks and channel blacks. In addition, as the carbon blacks, there may also be used self-dispersible carbon blacks.

Specific examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

The hue of the organic pigment used in the present invention is not particularly limited, and there may be used any chromatic color pigment having a yellow color, a magenta color, a cyan color, a blue color, a red color, an orange color, a green color, etc.

Specific examples of the preferred organic pigments include one or more pigments selected from the group consisting of commercially available products marketed under the tradenames C.I. Pigment Yellow, C.I. Pigment Red, C.I. Pigment Orange, C.I. Pigment Violet, C.I. Pigment Blue and C.I. Pigment Green, etc., with various product numbers.

The pigment contained in the water-based ink may be present in the form of pigment-containing polymer particles, from the viewpoint of enhancing fixing strength of the water-based ink onto a recording medium.

(Polymer)

In the present invention, from the viewpoint of enhancing dispersion stability of the pigment in the water-based ink for ink-jet printing, pigment-containing polymer particles are used. In the present invention, as the polymer constituting the pigment-containing polymer particles, there may be used a water-soluble polymer and a water-insoluble polymer. Of these polymers constituting the pigment-containing polymer particles, from the viewpoint of suppressing corrosion of inside materials of an ink-jet printer which come into contact with the ink, preferred is the water-insoluble polymer.

The water-soluble polymer as used herein means a polymer having a solubility in water of more than 10 g, preferably not less than 20 g, and more preferably not less than 30 g as measured by dissolving the polymer in 100 g of water at 25° C. On the other hand, the water-insoluble polymer as used herein means a polymer preferably having a solubility in water of not more than 10 g, more preferably not more than 5 g, and even more preferably not more than 1 g when the polymer is dried to constant weight at 105° C. for 2 h, and then dissolved in 100 g of water at 25° C. The "solubility" as used herein means the value measured by neutralizing 100% of a salt-forming group of the polymer with acetic acid or sodium hydroxide according to the kind of salt-forming group to be neutralized.

[Water-Soluble Polymer]

Examples of the water-soluble polymer used in the present invention include vinyl-based polymers, polyesters and polyurethanes. Of these polymers, preferred are vinyl-based polymers obtained by addition-polymerizing vinyl monomers, and more preferred are vinyl-based polymers containing a functional group capable of imparting a water solubility thereto such as a hydroxyl group or an ether group at a side chain thereof. The vinyl-based polymers containing a hydroxyl group or an ether group at a side chain thereof is a polymer containing a constitutional unit derived from a monomer containing a hydroxyl group or an ether group. Examples of the polymer containing a constitutional unit derived from a monomer containing a hydroxyl group or an ether group include a polymer containing a constitutional unit derived from an ester of an unsaturated carboxylic acid and an alkylene glycol, a polymer containing a constitutional unit derived from an alkylene glycol adduct of an unsaturated alcohol, etc. The alkylene glycol contained in these constitutional units may be in the form of a polyalkylene glycol. The alkylene glycol is preferably ethylene glycol from the viewpoint of enhancing water solubility of the polymer. Examples of the vinyl monomer from which the aforementioned constitutional unit is derived include hydroxyethyl acrylate, alkoxy polyethylene glycol (meth)acrylates, ethylene glycol adducts of allyl alcohol, etc. Meanwhile, the term "(meth)acrylate" as used herein means an acrylate, a methacrylate or both thereof.

The water-soluble polymer may also contain the other monomer than the monomer containing a hydroxyl group or an ether group as a constitutional monomer thereof. Examples of the other monomer constituting the water-soluble polymer include (i) monocarboxylic acids such as (meth)acrylic acid and crotonic acid, as well as salts of these acids (such as, for example, an alkali metal salt, an alkali earth metal salt, an ammonium salt and a mono-, di- or tri-alkyl ($C_2$ to $C_8$) ammonium salt that may be substituted with a hydroxyl group) and esters of these acids (such as, for example, a (meth)acrylate containing no monomer containing a hydroxyl group or an ether group). Further examples of the other monomer include (ii) dicarboxylic acid-based monomers such as maleic acid, itaconic acid and fumaric acid, as well as anhydrides of these acids, salts of these acids (such as, for example, an alkali metal salt, an alkali earth metal salt, an ammonium salt and a mono-, di- or tri-alkyl ($C_2$ to $C_8$) ammonium salt that may be substituted with a hydroxyl group) and esters of these acids. Of these monomers, preferred is at least one monomer selected from the group consisting of (meth)acrylic acid, maleic acid and maleic anhydride, and more preferred is (meth)acrylic acid or an alkali metal salt thereof.

Examples of the water-soluble polymer include polyhydroxyethyl acrylate, a copolymer of (meth)acrylic acid and an alkoxy polyethylene glycol (meth)acrylate, an ethylene glycol adduct of maleic acid and allyl alcohol, etc. Of these polymers, preferred is polyhydroxyethyl acrylate.

<Production of Water-Soluble Polymer>

The water-soluble polymer may be produced by known polymerization methods, and preferably has a polymerization concentration of not less than 10% by mass from the industrial viewpoints. Examples of the polymerization methods include radical polymerization, living radical polymerization, ionic polymerization, etc. Of these polymerization methods, preferred is the radical polymerization method. The polymerization solvent is not particularly limited as long as the monomers can be dissolved therein. Examples of the polymerization solvent include water, methanol, ethanol, isopropanol, benzene, toluene, xylene, cyclohexane, n-hexane, ethyl acetate, acetone, methyl ethyl ketone, etc. Of these polymerization solvents, preferred are water, methanol, ethanol and isopropanol.

As the polymerization initiator, there may be used known initiators such as azo-based initiators, peroxide-based initiators, macroinitiators and redox-based initiators. When using the polymerization solvent containing water, as the polymerization initiator, there may be used ammonium salts or alkali metal salts of persulfuric acid, as well as hydrogen peroxide and water-soluble azo compounds such as 2,2'-azobis(2-amidinopropane) dihydrochloride and 2,2'-azobis(2-methyl propionamide)dihydrate. When using the polymerization solvent containing no water, as the polymerization initiator, there may be used peroxides such as benzoyl peroxide and lauroyl peroxide, and aliphatic azo compounds such as azobis-isobutyronitrile.

In addition, the polymerization may also be conducted in the presence of a chain transfer agent for the purpose of acting as a molecular weight controller, etc., if required. Examples of the chain transfer agent include a thiol-based chain transfer agent, a halogenated hydrocarbon-based chain transfer agent, etc. Of these chain transfer agents, preferred is the thiol-based chain transfer agent.

As the thiol-based chain transfer agent, preferred are compounds containing a —SH group, and more preferred are compounds represented by the general formula: HS-R-Eg wherein R is a group derived from a hydrocarbon having 1 to 4 carbon atoms; E is —OH, —COOM, —COOR' or —$SO_3M$ (wherein M is a hydrogen atom, a monovalent metal, a divalent metal, an ammonium group or an organic amine group, and R' is an alkyl group having 1 to 10 carbon atoms); and g is an integer of 1 to 2. Specific examples of the thiol-based chain transfer agent include mercaptoethanol, thioglycerol, thioglycolic acid, 2-mercaptopropionic acid, 3-mercaptopropionic acid, thiomalic acid, octyl thioglycolate, octyl 3-mercaptopropionate, etc. Of these thiol-based chain transfer agents, from the viewpoint of attaining a good chain transfer effect in a copolymerization reaction of 1 to 3 monomers, preferred are mercaptopropionic acid and mercaptoethanol, and more preferred is mercaptopropionic acid. These thiol-based chain transfer agents may be used alone or in combination of any two or more thereof.

Examples of the halogenated hydrocarbon-based chain transfer agent include carbon tetrachloride, carbon tetrabromide, etc.

Examples of the other chain transfer agent include an α-methyl styrene dimer, terpinolene, α-terpinene, γ-terpinene, dipentene, 2-aminopropan-1-ol, etc. These chain transfer agents may be used alone or in combination of any two or more thereof.

The polymerization temperature is not particularly limited, and is preferably controlled to the temperature range not higher than a boiling point of the polymerization solvent.

The weight-average molecular weight of the water-soluble polymer is preferably not less than 5,000, more preferably not less than 10,000, and even more preferably not less than 12,000, from the viewpoint of attaining good dispersion stability of the pigment. Also, from the same viewpoint as described above, the weight-average molecular weight of the water-soluble polymer is preferably not more than 250,000, more preferably not more than 200,000, and even more preferably not more than 180,000. Meanwhile, the weight-average molecular weight of the water-soluble polymer may be measured by the method described in Examples below.

[Water-Insoluble Polymer]

Examples of the water-insoluble polymer used in the present invention include vinyl-based polymers, polyesters and polyurethanes. Of these polymers, preferred are vinyl-based polymers obtained by addition-polymerizing vinyl monomers, and more preferred are vinyl-based polymers containing a constitutional unit derived from a (meth)acrylic acid ester. Specific examples of the methacrylic acid ester include monomers corresponding to the meth)acrylic acid ester among the below-mentioned components (b) to (e).

The vinyl-based polymer used in the present invention is preferably a water-insoluble vinyl polymer that is produced by copolymerizing a monomer mixture containing (a) a salt-forming group-containing monomer (hereinafter also referred to merely as "component (a)"), and (b) a macromer (hereinafter also referred to merely as "component (b)") and/or (c) a hydrophobic monomer (hereinafter also referred to merely as "component (c)") (such a mixture is hereinafter also referred to merely as a "monomer mixture"). The water-insoluble vinyl polymer contains a constitutional unit derived from the component (a), and a constitutional unit derived from the component (b) and/or a constitutional unit derived from the component (c).

The salt-forming group-containing monomer (a) is used for enhancing dispersion stability of the resulting dispersion. Examples of the salt-forming group include a carboxy group, a sulfonic group, a phosphoric group, an amino group and an ammonium group.

Examples of the salt-forming group-containing monomer include cationic monomers and anionic monomers. Examples of the cationic monomers and anionic monomers are those described in paragraph [0022] of JP 9-286939A, etc.

Typical examples of the cationic monomers include unsaturated amine-containing monomers and unsaturated ammonium salt-containing monomers. Among these cationic monomers, preferred are N,N-dimethylaminoethyl (meth)acrylate, N—(N',N'-dimethylaminopropyl) (meth)acrylamide and vinyl pyrrolidone.

Meanwhile, the term "(meth)acrylamide" means acrylamide, methacrylamide or both thereof.

Typical examples of the anionic monomers include unsaturated carboxylic acid monomers, unsaturated sulfonic acid monomers and unsaturated phosphoric acid monomers.

Specific examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Specific examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic ester. Specific examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Of the above anionic monomers, from the viewpoint of attaining good dispersion stability of the resulting dispersion, preferred are unsaturated carboxylic acid monomers, and more preferred is at least one monomer selected from the group consisting of acrylic acid and methacrylic acid.

The macromer (b) is used for enhancing dispersion stability of the polymer particles, in particular, in the case where the polymer particles contain the pigment. Examples of the macromer (b) include those macromers in the form of a monomer containing a polymerizable unsaturated group which has a number-average molecular weight of not less than 500 and not more than 100,000 and preferably not less than 1,000 and not more than 10,000. Meanwhile, the number-average molecular weight of the macromer (b) may be measured by gel chromatography using chloroform containing 1 mmol/L of dodecyl dimethylamine as a solvent and using polystyrene as a reference standard substance.

Among these macromers (b), from the viewpoint of attaining good dispersion stability of the polymer particles, preferred are styrene-based macromers and aromatic group-containing (meth)acrylate-based macromers which have a polymerizable functional group at one terminal end thereof.

Examples of the styrene-based macromers include homopolymers of styrene-based monomers, and copolymers of the styrene-based monomers with other monomers. Examples of the styrene-based monomers include styrene, 2-methyl styrene, vinyl toluene, ethyl vinyl benzene, vinyl naphthalene and chlorostyrene.

As the aromatic group-containing (meth)acrylate-based macromers, there may be mentioned homopolymers of an aromatic group-containing (meth)acrylate or copolymers of the aromatic group-containing (meth)acrylate with other monomers. Examples of the aromatic group-containing (meth)acrylate include (meth)acrylates containing an arylalkyl group having not less than 7 and not more than 22 carbon atoms, preferably not less than 7 and not more than 18 carbon atoms, and more preferably not less than 7 and not more than 12 carbon atoms which may have a substituent group containing a hetero atom, or an aryl group having not less than 6 and not more than 22 carbon atoms, preferably not less than 6 and not more than 18 carbon atoms and more preferably not less than 6 and not more than 12 carbon atoms which may have a substituent group containing a hetero atom. Examples of the substituent group containing a hetero atom include a halogen atom, an ester group, an ether group and a hydroxyl group. Examples of the aromatic group-containing (meth)acrylate include benzyl (meth)acrylate, phenoxyethyl (meth)acrylate, 2-hydroxy-3-phenoxypropyl acrylate and 2-methacryloyloxyethyl-2-hydroxypropyl phthalate. Among these aromatic group-containing (meth)acrylates, preferred is benzyl (meth)acrylate.

The polymerizable functional group bonded to one terminal end of these macromers is preferably an acryloyloxy group or a methacryloyloxy group. Examples of the suitable other monomers copolymerizable with the aromatic group-containing (meth)acrylate include acrylonitrile, etc.

The content of the constitutional unit derived from the styrene-based monomer in the styrene-based macromer or the content of the constitutional unit derived from the aromatic group-containing (meth)acrylate in the aromatic group-containing (meth)acrylate-based macromer is preferably not less than 50% by mass, and more preferably not less than 70% by mass in view of enhancing an affinity of the polymer to pigments.

The macromer (b) may further contain side chains constituted of other constitutional units derived from an organopolysiloxane, etc. Such a side chain may be produced, for example, by copolymerizing the macromer with a silicone-based macromer having a polymerizable functional group at one terminal end thereof which is represented by the following formula (1):

$$CH_2=C(CH_3)-COOC_3H_6-[Si(CH_3)_2O]_t-Si(CH_3)_3 \quad (1)$$

wherein t is a number of not less than 8 and not more than 40.

Examples of the commercially available styrene-based macromer as the component (b) include AS-6(S), AN-6 (S) and HS-6(S) (tradenames) all available from Toagosei Co., Ltd., etc.

The hydrophobic monomer (c) is used from the viewpoint of enhancing optical density of the resulting ink, etc. Examples of the hydrophobic monomer include alkyl (meth)acrylates and aromatic group-containing monomers.

The preferred alkyl (meth)acrylates are those containing an alkyl group having not less than 1 and not more than 22 carbon atoms and preferably not less than 6 and not more than 18 carbon atoms. Examples of the alkyl (meth)acrylates include methyl (meth)acrylate, ethyl (meth)acrylate, (iso) propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso) decyl (meth)acrylate, (iso)dodecyl (meth)acrylate and (iso) stearyl (meth)acrylate.

Meanwhile, the terms "(iso- or tertiary-)" and "(iso)" as used in the present specification mean both the structure in which the groups expressed by "iso" and "tertiary" are present, and the structure in which these groups are not present (i.e., normal).

The aromatic group-containing monomer is preferably a vinyl monomer containing an aromatic group preferably having not less than 6 and not more than 22 carbon atoms, more preferably not less than 6 and not more than 18 carbon atoms and even more preferably not less than 6 and not more than 12 carbon atoms which may contain a substituent group having a hetero atom, and more preferably a styrene-based monomer or an aromatic group-containing (meth)acrylate.

As the styrene-based monomer, preferred are styrene, 2-methyl styrene and divinyl benzene, and more preferred is styrene.

Also, preferred examples of the aromatic group-containing (meth)acrylate include benzyl (meth)acrylate and phenoxyethyl (meth)acrylate. Of these aromatic group-containing (meth)acrylates, more preferred is benzyl (meth) acrylate.

As the hydrophobic monomer, the aforementioned monomers may be used in combination of any two or more kinds thereof, and the styrene-based monomer and the aromatic group-containing (meth)acrylate may be used in combination with each other.

The monomer mixture may further contain (d) a hydroxyl group-containing monomer (hereinafter also referred to merely as a "component (d)"). The hydroxyl group-containing monomer (d) is used to exhibit an excellent effect of enhancing dispersion stability of the resulting dispersion.

Examples of the component (d) include 2-hydroxyethyl (meth)acrylate, 3-hydroxypropyl (meth)acrylate, polyethylene glycol (n=not less than 2 and not more than 30 wherein n represents an average molar number of addition of oxyalkylene groups: hereinafter defined in the same way) (meth) acrylate, polypropylene glycol (n=not less than 2 and not more than 30) (meth)acrylate, and poly(ethylene glycol (n=not less than 1 and not more than 15)/propylene glycol (n=not less than 1 and not more than 15)) (meth)acrylate. Among these hydroxyl group-containing monomers, preferred are 2-hydroxyethyl (meth)acrylate, polyethylene glycol monomethacrylate and polypropylene glycol methacrylate.

The monomer mixture may further contain (e) a monomer represented by the following formula (2) (hereinafter also referred to merely as a "component (e)"):

$$CH_2=C(R^1)COO(R^2O)_pR^3 \quad (2)$$

wherein $R^1$ is a hydrogen atom or a lower alkyl group having not less than 1 and not more than 5 carbon atoms; $R^2$ is a divalent hydrocarbon group having not less than 1 and not more than 30 carbon atoms which may contain a hetero atom; $R^3$ is a monovalent hydrocarbon group having not less than 1 and not more than 30 carbon atoms which may contain a hetero atom; and p represents an average molar number of addition of $R^2O$ groups, and is a number of not less than 1 and not more than 60 and preferably a number of not less than 1 and not more than 30.

The component (e) is used to exhibit the effect of enhancing optical density of the resultant ink, etc.

Examples of the hetero atom in the formula (2) include a nitrogen atom, an oxygen atom, a halogen atom and a sulfur atom.

Examples of the suitable $R^1$ group include a methyl group, an ethyl group and an (iso)propyl group.

Examples of the suitable $R^2O$ group include an oxyethylene group, an oxy(iso)propylene group, an oxytetramethylene group, an oxyheptamethylene group, an oxyhexamethylene group, and an oxyalkylene group having not less than 2 and not more than 7 carbon atoms which is constituted of combination of at least two of these oxyalkylene groups.

Examples of the suitable $R^3$ group include an aliphatic alkyl group having not less than 1 and not more than 30 carbon atoms and preferably not less than 1 and not more than 20 carbon atoms, an aromatic ring-containing alkyl group having not less than 7 and not more than 30 carbon atoms, and a hetero ring-containing alkyl group having not less than 4 and not more than 30 carbon atoms.

Specific examples of the component (e) include methoxy polyethylene glycol (p in the formula (2): not less than 1 and not more than 30; hereinafter defined in the same way) (meth)acrylate, methoxy polytetramethylene glycol (p=not less than 1 and not more than 30) (meth)acrylate, ethoxy polyethylene glycol (p=not less than 1 and not more than 30) (meth)acrylate, octoxy polyethylene glycol (p=not less than 1 and not more than 30) (meth)acrylate, polyethylene glycol (p=not less than 1 and not more than 30) (meth)acrylate 2-ethylhexyl ether, (iso)propoxy polyethylene glycol (p=not less than 1 and not more than 30) (meth)acrylate, butoxy polyethylene glycol (p=not less than 1 and not more than 30) (meth)acrylate, methoxy polypropylene glycol (p=not less than 1 and not more than 30) (meth)acrylate, and methoxy (ethylene glycol/propylene glycol copolymer) (p=not less than 1 and not more than 30: among which the number of ethylene glycol constitutional units is not less than 1 and not more than 29) (meth)acrylate. Among these compounds, preferred are octoxy polyethylene glycol (p=not less than 1 and not more than 30) (meth)acrylate and polyethylene glycol (p=not less than 1 and not more than 30) (meth) acrylate 2-ethylhexyl ether.

Specific examples of the commercially available products of the components (d) and (e) include polyfunctional acrylate monomers (NK esters) available from Shin-Nakamura Kagaku Kogyo Co., Ltd., such as "M-40G", "M-90G", "M-230G" and "EH4E"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300" and "50POEP-800B".

These components (a) to (e) are respectively used alone or in the form of a mixture of any two or more thereof.

Upon production of the water-insoluble polymer, the contents of the above components (a) to (e) in the monomer mixture (contents of non-neutralized components; hereinafter defined in the same way) or the contents of the constitutional units derived from the components (a) to (e) in the water-insoluble polymer are as follows from the viewpoint of good dispersion stability of the resulting dispersion, etc.

The content of the component (a) is preferably not less than 2% by mass, and more preferably not less than 3% by mass, and is also preferably not more than 40% by mass, more preferably not more than 30% by mass, and even more preferably not more than 20% by mass.

The content of the component (b) is not less than 0% by mass, preferably not less than 1% by mass, and more preferably not less than 5% by mass, and is also preferably not more than 25% by mass, and more preferably not more than 20% by mass.

The content of the component (c) is preferably not less than 5% by mass, and more preferably not less than 10% by mass, and is also preferably not more than 98% by mass, more preferably not more than 95% by mass, and even more preferably not more than 90% by mass.

The content of the component (d) is not less than 0% by mass, preferably not less than 5% by mass, and more preferably not less than 7% by mass, and is also preferably not more than 40% by mass, and more preferably not more than 20% by mass.

The content of the component (e) is not less than 0% by mass, preferably not less than 5% by mass, and more preferably not less than 10% by mass, and is also preferably not more than 50% by mass, and more preferably not more than 40% by mass.

The total content of the components (a) and (d) [component (a)+component (d)] in the monomer mixture is preferably not less than 6% by mass, and more preferably not less than 10% by mass, and is also preferably not more than 60% by mass, and more preferably not more than 50% by mass. The total content of the components (a) and (e) [component (a)+component (e)] in the monomer mixture is preferably not less than 6% by mass, and more preferably not less than 13% by mass, and is also preferably not more than 75% by mass, and more preferably not more than 50% by mass. The total content of the components (a), (d) and (e) [component (a)+component (d)+component (e)] in the monomer mixture is preferably not less than 6% by mass, and more preferably not less than 7% by mass, and is also preferably not more than 60% by mass, and more preferably not more than 50% by mass.

Also, the mass ratio of the component (a) to a sum of the components (b) and (c) [component (a)/(component (b)+component (c))] is preferably not less than 0.01, more preferably not less than 0.02, and even more preferably not less than 0.03, and is also preferably not more than 0.67, and more preferably not more than 0.50.

<Production of Water-Insoluble Polymer>

The water-insoluble polymer used in the present invention may be produced by copolymerizing the monomer mixture by known methods such as bulk polymerization, solution polymerization, suspension polymerization and emulsion polymerization. Among these polymerization methods, preferred is the solution polymerization.

The solvent used in the solution polymerization method is preferably an organic polar solvent. The organic polar solvent miscible with water may be used in the form of a mixture with water. Examples of the organic polar solvents include aliphatic alcohols having 1 to 3 carbon atoms; ketones having 3 to 8 carbon atoms; and esters such as ethyl acetate. Among these solvents, preferred are methanol, ethanol, acetone, methyl ethyl ketone, methyl isobutyl ketone and mixed solvents of at least one thereof with water.

The polymerization may be carried out in the presence of a conventionally known radical polymerization initiator, e.g., azo compounds such as 2, 2'-azobisisobutyronitrile and 2,2'-azobis(2,4-dimethylvaleronitrile), and organic peroxides such as t-butyl peroxyoctoate and dibenzoyl oxide. The amount of the radical polymerization initiator to be used in the polymerization is preferably not less than 0.001 mol, and more preferably not less than 0.01 mol, and is also preferably not more than 5 mol, and more preferably not more than 2 mol, per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture may vary depending upon the kinds of radical polymerization initiator, monomers, solvent, etc., to be used, and therefore are not particularly limited. In general, the polymerization temperature is preferably not lower than 30° C., and more preferably not lower than 50° C., and is also preferably not higher than 100° C., and more preferably not higher than 80° C. The polymerization time is preferably not less than 1 h and not more than 20 h. Further, the polymerization is preferably conducted in a nitrogen gas atmosphere or an atmosphere of an inert gas such as argon.

After completion of the polymerization reaction, the polymer thus produced may be isolated from the resulting reaction solution by a known method such as reprecipitation and removal of solvent by distillation. The thus obtained polymer may be purified by repeated reprecipitation, membrane separation, chromatography, extraction, etc., for removing unreacted monomers, etc., therefrom.

The weight-average molecular weight of the water-insoluble polymer used in the present invention is preferably not less than 5,000, more preferably not less than 10,000 and even more preferably not less than 20,000, from the viewpoints of high optical density of the resulting ink and good dispersion stability of the pigment. In addition, the weight-average molecular weight of the water-insoluble polymer is preferably not more than 500,000, more preferably not more than 400,000, and even more preferably not more than 300,000, from the same viewpoints as described above. Meanwhile, the weight-average molecular weight of the water-insoluble polymer may be measured by the method as described in Examples below.

When the polymer contains a salt-forming group derived from the salt-forming group-containing monomer (a), the salt-forming group is neutralized with a neutralizing agent when using the polymer. As the neutralizing agent, acids or bases may be used according to the kind of salt-forming group to be neutralized in the polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as sodium hydroxide, potassium hydroxide, ammonia, alkyl amines and alkanol amines.

The degree of neutralization of the salt-forming group in the polymer as calculated from the mass ratio between the salt-forming group and neutralizing agent is preferably not less than 10%, more preferably not less than 20% and even more preferably not less than 50%, and is also preferably not more than 200%, and more preferably not more than 150%.

The degree of neutralization of the anionic salt-forming group is calculated according to the following formula:

[amount (g) of neutralizing agent/equivalent of neutralizing agent]/ [acid value of polymer (KOHmg/g)×weight (g) of polymer/(56× 1000)]×100.

The degree of neutralization of the cationic salt-forming group is calculated according to the following formula:

[mass (g) of neutralizing agent/equivalent of neutralizing agent]/ [amine value of polymer (HClmg/ g)×mass (g) of polymer/(36.5×1000)]×100.

The acid value or amine value may be calculated from the respective constitutional units of the polymer, or may also be determined by the method of subjecting a solution prepared by dissolving the polymer in an appropriate solvent (such as methyl ethyl ketone) to titration. The acid value or amine value of the polymer is preferably not less than 50 and not more than 200, and more preferably not less than 50 and not more than 150.

The production process of the present invention is not particularly limited as long as the process includes the step of dispersing a pigment in a polymer by means of a disperser using dispersing media particles containing a zirconium compound to introduce the solid zirconium compound into the water-based ink (zirconium compound introduction step). However, the production process of the present invention preferably includes the following steps (I) to (V) in which the zirconium compound introduction step is conducted in the step (II):

step (I): preparing a mixture including the polymer, organic solvent, pigment and water;

step (II): subjecting the mixture obtained in the step (I) to dispersing treatment using the dispersing media particles containing the zirconium compound to obtain a dispersion of the pigment-containing polymer particles;

step (III): removing the organic solvent from the dispersion of the pigment-containing polymer particles obtained in the step (II) to obtain a water dispersion of the pigment-containing polymer particles;

step (IV): removing coarse particles from the water dispersion obtained in the step (III) to obtain a water dispersion for ink-jet printing; and step (V): preparing the water-based ink for ink-jet printing using the water dispersion obtained in the step (IV).

In the following, the respective steps are described.

(Production of Dispersion of Pigment-Containing Polymer Particles)

In the present invention, in order to stably disperse the pigment, the polymer particles are used in the form of pigment-containing polymer particles. The method for producing the dispersion of the pigment-containing polymer particles is not particularly limited. However, the process including the following steps (I) and (II) is capable of efficiently producing the dispersion of the pigment-containing polymer particles:

step (I): preparing a mixture including the polymer, organic solvent, pigment and water; and step (II): subjecting the mixture obtained in the step (I) to dispersing treatment using the dispersing media particles containing the zirconium compound to obtain the dispersion of the pigment-containing polymer particles.

In the step (II), by dispersing the pigment in the polymer by means of the disperser using the dispersing media particles containing the zirconium compound, it is possible to introduce the solid zirconium compound into the water-based ink.

In the step (I), there is preferably used the method in which the polymer is first dissolved in the organic solvent, and then the pigment and water are added, if required, together with optional components such as a neutralizing agent and a surfactant, to the thus obtained organic solvent solution and mixed with each other to obtain a dispersion of an oil-in-water type. The content of the pigment in the resulting mixture is preferably not less than 5% by mass, and more preferably not less than 10% by mass, and is also preferably not more than 50% by mass, and more preferably not more than 40% by mass. The content of the organic solvent in the mixture is preferably not less than 10% by mass, and is also preferably not more than 40% by mass, and more preferably not more than 30% by mass. The content of the polymer in the mixture is preferably not less than 2% by mass, and more preferably not less than 3% by mass, and is also preferably not more than 40% by mass, and more preferably not more than 20% by mass. The content of water in the mixture is preferably not less than 40% by mass, and more preferably not less than 50% by mass, and is also preferably not more than 80% by mass.

When the polymer contains a salt-forming group, the neutralizing agent is preferably used for neutralizing the salt-forming group. The degree of neutralization of the salt-forming group in the polymer with the neutralizing agent is not particularly limited. In general, the degree of neutralization is preferably controlled such that the finally obtained dispersion exhibits a neutral liquid property, for example, a pH of not less than 4.5 and not more than 10. The pH of the dispersion may also be determined from the desired degree of neutralization of the polymer. The neutralizing agent used in the present invention are those exemplified above. In addition, the polymer may be previously neutralized.

Examples of the organic solvent include alcohol solvents such as ethanol, isopropanol and isobutanol; ketone solvents such as acetone, methyl ethyl ketone, methyl isobutyl ketone and diethyl ketone; and ether solvents such as dibutyl ether, tetrahydrofuran and dioxane. The solubility of these organic solvents in 100 g of water as measured at 20° C. is preferably not less than 5 g, and more preferably not less than 10 g, and is also preferably not more than 80 g, and more preferably not more than 50 g. In particular, of these organic solvents, preferred is at least one organic solvent selected from the group consisting of methyl ethyl ketone and methyl isobutyl ketone.

The boiling point of the organic solvent as measured at 1 atm is preferably not lower than 50° C., and more preferably not lower than 60° C., and is also preferably not higher than 90° C., and more preferably not higher than 80° C.

The method for dispersing the mixture in the step (II) is not particularly limited. In the step (II), in order to introduce the solid zirconium compound into the water-based ink, there are used the dispersing media particles containing the zirconium compound. Therefore, the polymer particles may be atomized into fine particles having a desired average particle size only by a substantial dispersion treatment. However, it is preferred that the mixture is first subjected to a preliminary dispersion treatment, and then to the substantial dispersion treatment by applying a shear stress thereto so as to control the average particle size of the obtained polymer particles to a desired value.

As a means for applying a shear stress to the mixture in the substantial dispersion treatment, there may be used, for example, dispersing devices such as a roll mill, a kneader and an extruder, media dispersers such as a sand mill and a beads mill, chamber-type high-pressure homogenizers, and the like. Among the methods using these apparatuses, from the viewpoint of efficiently reducing the size of the polymer particles, there is preferably used the wet pulverization method that may be conducted by means of the disperser using the dispersing media particles. In addition, there may be adopted the method in which after subjecting the dispersion to wet pulverization, if required, the resulting dispersion is further dispersed by a high-pressure dispersion method using a high-pressure homogenizer, etc.

The material of the dispersing media particles includes a zirconium compound, from the viewpoint of introducing the solid zirconium compound into the water-based ink. The dispersing media particles preferably contain the aforementioned zirconium compound. The dispersing media particles used upon introducing the solid zirconium compound into the water-based ink are preferably present in such a state as abraded by the use to a certain extent. The preferred degree of abrasion of the dispersing media particles is the same as described previously. The particle size of the dispersing media particles is preferably not less than 10 μm and not more than 500 μm, and more preferably not less than 10 μm and not more than 200 μm, from the viewpoint of efficiently reducing the particle size of the polymer particles.

In the wet pulverization dispersion treatment, the mass ratio of the dispersing media particles to the dispersion (including all components constituting the dispersion, such as the pigment, polymer, water and organic solvent) [dispersing media particles/dispersion] is preferably not less than 0.3, more preferably not less than 1.0, and even more preferably not less than 3.0, and is also preferably not more than 15, and more preferably not more than 12. The packing rate of the dispersing media particles in the disperser preferably not less than 50%, and more preferably not less than 70%, and is also preferably not more than 95%, and more preferably not more than 90%, from the viewpoints of efficiently reducing the particle size of the polymer particles and introducing the solid zirconium compound into the water-based ink.

The peripheral speed of the disperser using the dispersing media particles means a speed of an outer periphery of an agitation blade if the disperser has the agitation blade. In the present invention, the peripheral speed of the disperser is preferably not less than 3 m/s, and more preferably not less than 5 m/s, and is also preferably not more than 30 m/s, and more preferably not more than 25 m/s. If the disperser has no agitation blade, the peripheral speed of the disperser means a rotating speed of a container thereof. In such a case, in the present invention, the peripheral speed of the disperser is preferably controlled to the range of not less than 0.1 m/s and not more than 1 m/s.

The dispersing time is preferably not less than 1 h, and more preferably not less than 1.5 h, and is also preferably not more than 15 h, and more preferably not more than 10 h. The temperature upon the dispersion treatment is preferably not lower than 0° C., and more preferably not lower than 5° C., and is also preferably not higher than 60° C., and more preferably not higher than 30° C., from the same viewpoints as described above.

In the step (II), it is possible to obtain the dispersion of the pigment-containing polymer particles (stock solution dispersion). The solid content of the dispersion is preferably not less than 5% by mass, more preferably not less than 10% by mass, and is also preferably less than 25% by mass, and more preferably not more than 20% by mass.

(Production of Water Dispersion for Ink-Jet Printing)

The thus obtained stock solution dispersion is preferably subjected to the following steps (III) and (IV), so that it is possible to obtain a water dispersion for ink-jet printing which can be used in the water-based ink:

step (III): removing the organic solvent from the dispersion of the pigment-containing polymer particles obtained in the step (II) to obtain a water dispersion of the pigment-containing polymer particles; and step (IV): removing coarse particles from the water dispersion obtained in the step (III) to obtain the water dispersion for ink-jet printing.

In the step (III), the organic solvent is removed from the dispersion of the pigment-containing polymer particles (stock solution dispersion) obtained in the step (II) to thereby obtain the water dispersion of the pigment-containing polymer particles. The method of removing the organic solvent is not particularly limited, and there may be used, for example, a method of distilling off the organic solvent or water under heating or under reduced pressure to concentrate the dispersion, a method of precipitating the pigment-containing polymer particles by centrifugal separation to concentrate the dispersion, a vacuum drying method, a freeze drying method, or combination of these methods.

In addition, from the viewpoint of excluding defective particles, it is preferred that not only the organic solvent but also a part of water are removed from the dispersion to efficiently exclude the defective particles therefrom. For example, after first removing the organic solvent, the resulting water dispersion of the pigment-containing polymer particles may be further concentrated.

The amount of water removed from the dispersion is preferably not less than 10 parts by mass, and more preferably not less than 50 parts by mass, and is also preferably not more than 500 parts by mass, and more preferably not more than 400 parts by mass, on the basis of 100 parts by mass of the water dispersion of the pigment-containing polymer particles obtained in the step (III).

The temperature upon concentrating the dispersion is not particularly limited, and is preferably not lower than 50° C., and more preferably not lower than 55° C., and is also preferably not higher than 90° C., and more preferably not higher than 85° C. The temperature upon the concentration is preferably not lower than a boiling point of the organic solvent from the viewpoint of distilling off the organic solvent. The pressure upon the concentration is not particularly limited, and the concentration of the dispersion may be conducted under normal pressures, under reduced pressure or under applied pressure, and is preferably conducted under reduced pressure from the viewpoint of distilling off the organic solvent. The dispersion treating time may vary depending upon the temperature and pressure used, and is preferably not less than 0.5 h, and more preferably not less than 1 h, and is also preferably not more than 10 h.

From the viewpoint of excluding defective particles, the concentration of the dispersion is conducted such that the solid content of the stock solution dispersion is preferably not less than 10% by mass, more preferably not less than 12% by mass, and even more preferably not less than 15% by mass, and is also preferably not more than 40% by mass, and more preferably not more than 35% by mass. Meanwhile, it is considered that the unstable particles in the dispersion are aggregated into coarse particle by the concentration operation.

In addition, from the viewpoint of excluding the defective particles, the difference between the solid content of the stock solution dispersion and the solid content of the water dispersion of the pigment-containing polymer particles obtained in the step (III) is preferably not less than 5% by mass, and more preferably not less than 7% by mass, and is also preferably not more than 25% by mass, more preferably not more than 20% by mass, and even more preferably not more than 15% by mass.

Meanwhile, from the viewpoint of readily removing the coarse particles, prior to the step (IV), an aqueous medium may be added to the thus concentrated water dispersion to suitably dilute the water dispersion and control a solid content thereof. The aqueous medium preferably contains water as a main component, and more preferably is water.

In the step (IV), coarse particles are removed from the water dispersion obtained in the step (III) to obtain a water dispersion for ink-jet printing.

As the method of removing the coarse particles, there may be used, for example, membrane treatments such as dialysis and ultrafiltration, centrifugal separation treatments, gel filtration treatments, etc. Of these methods, from the viewpoint of high efficiency and low cost, preferred are the centrifugal separation treatments. Meanwhile, any of the methods is conducted under the condition that the solid zirconia compound is allowed to remain in the water dispersion.

In the centrifugal separation treatments, after the water dispersion is diluted, the resulting diluted water dispersion is subjected to centrifugal separation to separate the dispersion into a supernatant solution and solids. The supernatant solution is withdrawn as the water dispersion, and used as the water dispersion for ink-jet printing With the above procedure, the pigment particles or unstable polymer fine particles in which the polymer tends to be hardly adsorbed onto the pigment to a sufficient extent and therefore a majority of the pigment is exposed outside are aggregated into coarse particles, and the thus formed coarse particles are removed from the dispersion, so that the resulting water dispersion can be improved in filtration property through a filter to a considerable extent.

The centrifugal acceleration upon the centrifugal separation is preferably not less than 500 G, and more preferably not less than 1000 G, from the viewpoint of reducing contents of components in the stock solution dispersion which tend to cause deterioration in filtration property through a filter or dispersion stability, for example, such as pigment-containing polymer particles having a large particle size, pigment particles having a small particle size which are not incorporated into the polymer, polymer fine particles that are not adsorbed onto the pigment and present in a floated state, etc. Also, the centrifugal acceleration upon the centrifugal separation is preferably not more than 5000 G, and more preferably not less than 3000 G, from the viewpoint of enhancing a yield of the desired product by suppressing loss of solids therein as well as durability of the centrifugal separator.

The centrifugal acceleration is defined by the following formula, and may be frequently expressed by the following relative centrifugal acceleration.

$$\text{Centrifugal Acceleration } [m/s^2]=N^2\pi^2 r/900$$

wherein N is a revolution number (rpm); r is a radius of gyration; it is the ratio of the circumstance of a circle to its diameter.

$$\text{Relative Centrifugal Acceleration } [G]=N^2\pi^2 r/900/9.8$$

The product of the centrifugal acceleration and the centrifugal separation time upon the centrifugal separation is preferably not less than 200 G·h, and more preferably not less than 300 G·h, from the viewpoint of sufficiently separating the solid components from the water dispersion and preventing the solid components and the supernatant solution from being mixed again after stopping the centrifugal acceleration, and is also preferably not more than 2000 G·h, and more preferably not more than 1000 G·h, from the viewpoints of shortening the treating time, attaining good durability of the centrifugal separator, and allowing the solid zirconia compound to remain in the water dispersion.

The centrifugal separation time is not particularly limited, and is preferably not less than 10 min, and more preferably not less than 15 min, from the viewpoint of efficiently removing coarse particles, and is also preferably not more than 60 min, and more preferably not more than 30 min, from the viewpoint of allowing the solid zirconia compound to remain in the water dispersion.

The centrifugal separator used in the present invention is not particularly limited, and those basket-type centrifugal separators as described in JP 2003-93811A, JP 2005-194325 A, etc., are preferably used.

The type of the basket used in the basket-type centrifugal separators is also not particularly limited. As the basket-type centrifugal separators, there are generally known a centrifugal settler and a centrifugal filtration dehydrator. Of these centrifugal separators, preferred is the centrifugal settler (for example, refer to The Society of Chemical Engineers, Japan "Handbook of Chemical Devices and Equipments", Revised 2nd Edition 2nd Printing, published by Maruzen Co., Ltd., Apr. 5, 1996, p 798).

Examples of the centrifugal settler include a centrifugal precipitation tube-type centrifugal settler, a cylinder-type centrifugal settler, a separation plate-type centrifugal settler, a basket-type centrifugal settler, and a screw decanter-type centrifugal settler. Of these centrifugal settlers, from the viewpoint of good operability such as cleanability, preferred is the basket-type centrifugal settler. Further, the basket-type centrifugal settler having a skimming function is more preferably used from the viewpoint of efficiently withdrawing the supernatant solution therefrom.

Examples of such a non-porous wall basket-type centrifugal separator include centrifugal separators such as "KBS Model" available from Kansai Centrifugal Separator M.F.G. Co., Ltd., "S Model" available from Tanabe Wilitec Inc., and the like.

The method of operating the centrifugal separator is not particularly limited, and may be any of (i) a continuous method in which the solution layer separated is withdrawn while feeding the stock solution dispersion, and (ii) a batch method in which after feeding the stock solution dispersion, at the time at which the solution layer to be separated is formed, the solution layer is withdrawn from the centrifugal separator.

After completion of the centrifugal separation, the supernatant solution thus withdrawn may be directly used as the water dispersion for ink-jet printing, or may be used in the form of an aqueous mixture by adding water to the supernatant solution, if required.

The surface tension of the water dispersion (as measured at 20° C.) is preferably not less than 30 N/m, and more preferably not less than 35 N/m, and is also preferably not more than 65 N/m, and more preferably not more than 60 N/m.

The viscosity of the water dispersion (as measured with respect to a 10% by mass dispersion at 20° C.) is preferably not less than 2 mPa·s, and is also preferably not more than 6 mPa·s, and more preferably not more than 5 mPa·s, in order to prepare a water-based ink having a desired viscosity.

The content of water in the water dispersion is preferably not less than 30% by mass, and more preferably not less than 40% by mass, and is also preferably not more than 90% by mass, and more preferably not more than 80% by mass.

In addition, the average particle size of the pigment-containing polymer particles in the water dispersion is preferably not less than 40 nm, more preferably not less than 50 nm, and even more preferably not less than 60 nm, and is also preferably not more than 300 nm, more preferably not more than 200 nm, and even more preferably not more than 150 nm, from the viewpoints of good dispersion stability and image quality.

(Production of Water-Based Ink for Ink-Jet Printing)

In the step (V), the water-based ink for ink-jet printing is prepared using the water dispersion obtained in the step (IV).

The water-based ink for ink-jet printing obtained by the production process of the present invention includes the above-obtained water dispersion for ink-jet printing. As the method for preparing the water-based ink for ink-jet printing, there may be mentioned a method in which various additives ordinarily used in inks such as wetting agents, penetrants, dispersants, viscosity modifiers, defoaming agents, mildew-proof agents and rust preventives are further added to the water dispersion for ink-jet printing, and a method in which the water dispersion is further subjected to filtration using a filter, etc.

The resulting water-based ink obtained after adding the aforementioned additives to the water dispersion is preferably further subjected to filtration using a filter, etc. The pore diameter of the filter is preferably not more than 2.0 μm, more preferably not more than 1.5 μm, and even more preferably not more than 1.2 μm, from the viewpoint of preventing inclusion of the zirconium compound having a large particle size, etc., and is also preferably not less than 0.05 μm, and more preferably not less than 0.1 μm, from the viewpoint of good filterability. Meanwhile, as described above, in the present invention, the particle size of the solid zirconium compound contained in the water-based ink is regarded as being not larger than the pore diameter of the filter used upon filtration of the water-based ink. More specifically, the zirconium compound preferably has a particle size capable of passing through a filter having a pore diameter of 1.2 μm.

The preferred content of water in the water-based ink for ink-jet printing obtained by the production process of the present invention and the preferred average particle size of the pigment-containing polymer particles therein are the same as those of the aforementioned water dispersion. In addition, the water-based ink for ink-jet printing obtained by the production process of the present invention contains the solid zirconium compound, and the concentration of zirconium in the ink is the same as described above.

The surface tension of the water-based ink obtained by the production process of the present invention (as measured at 25° C.) is preferably not less than 20 mN/m, and more preferably not less than 25 mN/m, and is also preferably not more than 35 mN/m, from the viewpoint of ensuring good ejection property of the ink from nozzles.

The viscosity of the water-based ink obtained by the production process of the present invention (as measured at 20° C.) is preferably not less than 2 mPa·s, and more preferably not less than 2.5 mPa·s, and is also preferably not more than 12 mPa·s, and more preferably not more than 10 mPa·s, in order to maintain good ejection property of the ink.

(Image Forming Method, Method of Storing Water-Based Ink for Ink-Jet Printing, and Corrosion Preventing Method)

The water-based ink for ink-jet printing obtained by the production process of the present invention can be used to form images using an ink-jet printer equipped with a print head whose inside portion is made of an inorganic material. The inorganic material as a material of the inside portion of the print head is preferably a ceramic material, more preferably a ceramic material containing a silicon-containing compound, and even more preferably a ceramic material containing silicon nitride, form the viewpoint of exhibiting good corrosion preventing effect.

In addition, in the case where not only the inside portion of the print head, but also portions of a storage container or the other portions of the ink-jet printer which come into contact with the ink are made of an inorganic material such as a ceramic material, the effect of preventing corrosion of these portions can be well exhibited by using the water-based ink for ink-jet printing obtained by the production process of the present invention. Thus, the water-based ink for ink-jet printing obtained by the production process of the present invention is excellent in dispersion stability, and also suitable for storage. Therefore, the water-based ink obtained by the production process of the present invention can be suitably used in a method of storing a water-based ink for ink-jet printing within an apparatus made of an inorganic material, preferably an inorganic material containing silicon nitride, and a method of preventing corrosion of the inorganic material.

With respect to the aforementioned embodiments, the present invention further provides the following aspects relating to the process for producing a water-based inks for ink-jet printing, the image forming method, the storage method, the corrosion preventing method, and the use of the water-based ink for forming images.

<1> A process for producing a water-based ink for ink-jet printing, including the step of dispersing a pigment in a polymer by means of a disperser using dispersing media particles containing a zirconium compound to introduce the solid zirconium compound into the water-based ink, the water-based ink including the pigment-containing polymer particles and the solid zirconium compound, and having a zirconium compound content of not less than 2 ppm, preferably not less than 3 ppm, more preferably not less than 5 ppm, even more preferably not less than 10 ppm, further even more preferably not less than 20 ppm, and further even more preferably not less than 40 ppm, and also not more than 200 ppm, preferably not more than 170 ppm, more preferably not more than 150 ppm, even more preferably not more than 80 ppm, and further even more preferably not more than 60 ppm, in terms of a concentration of zirconium in the water-based ink.

<2> The process for producing a water-based ink for ink-jet printing according to the aspect <1>, including the following steps (I) to (V) in which the step of introducing the solid zirconium compound into the water-based ink is conducted in the step (II);

step (I); preparing a mixture including the polymer, an organic solvent, the pigment and water;

step (II); subjecting the mixture obtained in the step (I) to dispersing treatment using the dispersing media particles containing the zirconium compound to obtain a dispersion of the pigment-containing polymer particles;

step (III): removing the organic solvent from the dispersion of the pigment-containing polymer particles obtained in the step (II) to obtain a water dispersion of the pigment-containing polymer particles;

step (IV): removing coarse particles from the water dispersion obtained in the step (III) to obtain a water dispersion for ink-jet printing; and step (V): preparing the water-based ink for ink-jet printing using the water dispersion obtained in the step (IV).

<3> The process for producing a water-based ink for ink-jet printing according to the aspect <1> or <2>, wherein the polymer is a water-insoluble polymer having a solubility in water of not more than 10 g, preferably not more than 5 g, and more preferably not more than 1 g as measured by dissolving the polymer in 100 g of water at 25° C.

<4> The process for producing a water-based ink for ink-jet printing according to the aspect <3>, wherein the water-insoluble polymer is at least one polymer selected from the group consisting of vinyl-based polymers, polyesters and polyurethanes, and preferably a vinyl-based polymer obtained by addition-polymerizing a vinyl monomer.

<5> The process for producing a water-based ink for ink-jet printing according to the aspect <3> or <4>, wherein the water-insoluble polymer is the vinyl-based polymer containing a constitutional unit derived from a (meth)acrylic acid ester.

<6> The process for producing a water-based ink for ink-jet printing according to any one of the aspects <3> to <5>, wherein a weight-average molecular weight of the water-insoluble polymer is not less than 5,000, preferably not less than 10,000, and more preferably not less than 20,000, and is also not more than 500,000, preferably not more than 400,000, and more preferably not more than 300,000.

<7> The process for producing a water-based ink for ink-jet printing according to any one of the aspects <2> to <6>, wherein a boiling point of the organic solvent as measured at 1 atm is not lower than 50° C., and preferably not lower than 60° C., and is also not higher than 90° C., and preferably not higher than 80° C.

<8> The process for producing a water-based ink for ink-jet printing according to any one of the aspects <1> to <7>, wherein the zirconium compound is at least one compound selected from the group consisting of zirconium, zirconia, zircon and a solid solution of any of these compounds with a rare earth oxide, preferably at least one compound selected from the group consisting of zirconia and zircon, and more preferably zirconia.

<10<9> The process for producing a water-based ink for ink-jet printing according to any one of the aspects <2> to <8>, wherein in the step (II), a mass ratio of the dispersing media particles to the dispersion (including all components constituting the dispersion, such as the pigment, polymer, water and organic solvent) [dispersing media particles/dispersion] is not less than 0.3, preferably not less than 1.0, and more preferably not less than 3.0, and is also not more than 15, and preferably not more than 12.

<10> The process for producing a water-based ink for ink-jet printing according to any one of the aspects <2> to <9>, wherein a method of removing coarse particles in the step (IV) is conducted by a membrane treatment, a centrifugal separation treatment or a gel filtration treatment, and preferably by a centrifugal separation treatment.

<11> The process for producing a water-based ink for ink-jet printing according to any one of the aspects <1> to <10>, wherein the solid zirconium compound used in the water-based ink has a particle size that allows the solid zirconium compound to pass through a filter having a pore diameter of 1.2 μm.

<12> The process for producing a water-based ink for ink-jet printing according to any one of the aspects <1> to <11>, wherein the water-based ink is used in an ink-jet printer including a print head an inside portion of which is made of an inorganic material, preferably a ceramic material, and more preferably a ceramic material containing a silicon-containing compound.

<13> The process for producing a water-based ink for ink-jet printing according to the aspect <12>, wherein the inorganic material includes silicon nitride, and is preferably a ceramic material containing silicon nitride.

<14> The process for producing a water-based ink for ink-jet printing according to any one of the aspects <1> to <13>, wherein an average particle size of the pigment-containing polymer particles is not less than 40 nm, preferably not less than 50 nm, and more preferably not less than 60 nm, and is also not more than 300 nm, preferably not more than 200 nm, and more preferably not more than 150 nm.

<15> The process for producing a water-based ink for ink-jet printing according to any one of the aspects <1> to <14>, wherein a use history of the dispersing media particles is controlled such that the cumulative net power as measured by operating the disperser packed with the dispersing media particles is not less than 1500 kwh/kg, preferably not less than 1750 kwh/kg, more preferably not less than 1900 kwh/kg, and even more preferably not less than 2100 kwh/kg, and is also not more than 10000 kwh/kg, preferably not more than 5000 kwh/kg, and more preferably not more than 3000 kwh/kg.

<16> The process for producing a water-based ink for ink-jet printing according to any one of the aspects <2> to <15>, wherein a packing rate of the dispersing media particles in the disperser in the step (II) is not less than 50%, and preferably not less than 70%, and is also not more than 95%, and preferably not more than 90%.

<17> An image forming method including the step of using the water-based ink for ink-jet printing produced by the process according to any one of the aspects <1> to <16> in an ink-jet printer including a print head an inside portion of which is made of an inorganic material, preferably a ceramic material, and more preferably a ceramic material containing a silicon-containing compound, to form images.

<18> A method of storing a water-based ink for ink-jet printing, including the step of storing the water-based ink for ink-jet printing produced by the process according to any one of the aspects <1> to <16> in an apparatus an inside portion of which is made of an inorganic material, preferably a ceramic material, and more preferably a ceramic material containing a silicon-containing compound.

<19> A method of preventing corrosion of an inorganic material, preferably a ceramic material, and more preferably a ceramic material containing a silicon-containing compound, using the water-based ink for ink-jet printing produced by the process according to any one of the aspects <1> to <16>.

<20> The method according to any one of the aspects <17> to <19>, wherein the inorganic material includes silicon nitride, and is preferably a ceramic material containing silicon nitride.

<21> A use of the water-based ink for ink-jet printing produced by the process according to any one of the aspects <1> to <16> for forming images by an ink-jet printing method.

EXAMPLES

In the following Production Examples, Examples and Comparative Examples, the "part(s)" and "%" indicate "part(s) by mass" and "% by mass", respectively, unless otherwise specified. Meanwhile, the methods of measuring the weight-average molecular weight of the polymer, the average particle size of the polymer particles and the solid content as well as the methods of evaluating the ink were as follows.

(1) Measurement of Weight-Average Molecular Weight of Polymer (1-1) Water-Insoluble Polymer The weight-average molecular weight of the water-insoluble polymer was measured by gel chromatography using N,N-dimethyl formamide containing phosphoric acid and lithium bromide in amounts of 60 mmol/L and 50 mmol/L, respectively, as a solvent, and using a monodisperse polystyrene having a known weight-average molecular weight as a reference standard substance. Measuring Conditions:

Column used: "TSK-GEL α-M"×2 available from Tosoh Corporation; GPC apparatus used: "HLC-8120GPC" available from Tosoh Corporation; Flow rate: 1 mL/min (1-2) Water-Soluble Polymer The weight-average molecular weight of the water-soluble polymer was measured by gel chromatography using methyl chloride containing dimethyl lauryl amine in an amount of 1 mmol/L as a solvent, and using a monodisperse polystyrene having a known weight-average molecular weight as a reference standard substance.

Measuring Conditions:

Column used: Shodex "K-804L"×2; Flow rate: 1 mL/min (2) Measurement of Solid Content of Water Dispersion of Pigment-Containing Polymer Particles Ten grams (10.0 g) of sodium sulfate dried to constant weight in a desiccator were weighed and charged in a 30 mL plastic container ("Pla-Pot 3-30" available from Nakajima Bensaku Shoten, K.K.), and about 1.0 g of a sample was added to the container. The contents of the container were mixed and then accurately weighed. The resulting mixture was held in the container at 105° C. for 2 h to remove volatile components therefrom and further allowed to stand in a desiccator for 15 min to measure a mass thereof. The mass of the sample after removing the volatile components therefrom was regarded as a mass of solids therein. The solid content of the sample was calculated by dividing the mass of the solids by the mass of the sample added.

(3) Measurement of Average Particle Size of Pigment-Containing Polymer Particles The average particle size of the particles was measured using a laser particle analyzing system (available from Otsuka Electronics Co., Ltd.; Model No.: "ELS-8000"; cumulant analysis). In the measurement, there was used the dispersion diluted with water such that a concentration of the particles therein was about $5 \times 10^{-3}$% by mass. The measurement was conducted at a temperature of 25° C., an angle between incident light and detector of 90° and a cumulative number of 100 times, and a refractive index of water (1.333) was input to the analyzing system as a refractive index of the dispersing medium.

(4) Measurement of Content of Zirconium Compound in Water-Based Ink for Ink-Jet Printing The concentration of zirconium in the water-based ink obtained in the respective Examples and Comparative Examples was measured by ICP (inductively coupled plasma) emission spectrometry using "ULTRAC JY238" (detection lower limit: 1 mg/kg) available from HORIBA Ltd., to calculate a content of zirconium in terms of the zirconium concentration per 1 kg of the water-based ink.

(5) Determination of Presence or Absence of Solid Zirconium Compound in Water-Based Ink Eight hundred milliliters (800 mL) of the water-based ink obtained in the respective Examples and Comparative Examples were filled in a non-porous wall basket-type centrifugal separator ("himac CR7" available from Hitachi Koki Co., Ltd.; radius: 11.2 cm; capacity: 1,000 mL), and subjected to centrifugal separation at a temperature set to 20° C. at a rotating speed of 2300 rpm (1500 G) for 10 min. After completion of the centrifugal separation, a supernatant solution was withdrawn from a portion of a centrifuge tube located 2 cm below an upper end thereof, whereas a bottom liquid was withdrawn from a portion of the centrifuge tube located 2 cm above a bottom end thereof, and the thus withdrawn supernatant solution and bottom liquid were respectively subjected to the same ICP measurement as in the above (4). In the case where the difference between the concentrations of zirconium in the supernatant solution and bottom liquid was not lower than 20%, it was determined that the solid zirconium compound was included in the ink.

(6) Evaluation of Corrosion

Twenty milliliters (20 mL) of the water-based ink obtained in the respective Examples and Comparative Examples were filled in a 30 mL plastic container ("Pla-Pot 3-30" available from Nakajima Bensaku Shoten, K.K.), and a test piece prepared by coating an $SiO_2$ substrate of 2 cm×2 cm with a silicon nitride film was dipped therein at an ambient temperature of 70° C. After the elapse of 2 days from the dipping, the test piece was taken out from the ink, and washed with water to remove the ink attached therefrom. Then, the thickness of the silicon nitride film was measured using an ellipsometer to calculate reduction in thickness of the silicon nitride film owing to corrosion thereof. Immediately after the thickness measurement, the test piece was dipped again in the water-based ink, and after the elapse of 7 days from the dipping, the test piece was taken out from the ink and subjected to the same procedure as conducted above to calculate reduction in thickness of the silicon nitride film by the above procedure.

The smaller the amount of reduction in thickness of the silicon nitride film, the less the corrosion and the better the result are attained.

(7) Evaluation of Dispersion Stability

The water-based ink obtained in the respective Examples and Comparative Examples was subjected to storage test in a closed container maintained at a constant temperature of 60° C. After two weeks, the water-based ink was taken out from the container to measure an average particle size of particles in the water-based ink and thus observe the change in average particle size thereof from an initial stage of the storage test. The rate of change in average particle size of particles in the ink was calculated (round down to the nearest decimal) according to the following formula, thereby evaluating dispersion stability of the water-based ink. The closer to 100% the rate of change in average particle size of particles in the ink, the more excellent the dispersion stability of the ink.

[Evaluation Criteria]

Rate of Change in Average Particle Size (%)=[(Average Particle Size before Storage)/(Average Particle Size after Storage)]×100

Production Examples 1 to 3 (Production of Water-Insoluble Polymers A to C)

The monomers, solvent, polymerization initiator and chain transfer agent as shown in each column "Initially Charged Monomer Solution" in Table 1 were charged into a reaction vessel equipped with two dropping funnels 1 and 2 and mixed with each other, and an inside atmosphere of the reaction vessel was replaced with a nitrogen gas, thereby obtaining an initially charged monomer solution.

On the other hand, the monomers, solvent, polymerization initiator and chain transfer agent as shown in each column "Dropping Monomer Solution 1" and each column "Dropping Monomer Solution 2" in Table 1 were respectively mixed with each other to obtain a dropping monomer solution 1 and a dropping monomer solution 2. The resulting dropping monomer solution 1 and dropping monomer solution 2 were charged into the dropping funnel 1 and the dropping funnel 2, respectively, and an inside atmosphere of each of the dropping funnel 1 and the dropping funnel 2 was replaced with a nitrogen gas.

In a nitrogen atmosphere, the initially charged monomer solution in the reaction vessel was held at 75° C. while stirring, and the dropping monomer solution 1 in the dropping funnel 1 was gradually added dropwise to the reaction vessel over 3 h. Next, the dropping monomer solution 2 in the dropping funnel 2 was gradually added dropwise to the reaction vessel over 2 h. After completion of the dropwise addition, the mixed solution in the reaction vessel was stirred at 75° C. for 2 h. Then, a polymerization initiator solution prepared by dissolving 1.5 parts of the above polymerization initiator "V-65" in 10 parts of MEK was added to the mixed solution, and the resulting reaction solution was aged at 80° C. for 1 h while stirring. The above procedure including the preparation and addition of the polymerization initiator solution and the aging of the reaction solution was repeated two more times. Then, the reaction solution in the reaction vessel was maintained at 85° C. for 2 h, thereby obtaining polymer solutions containing polymers A to C, respectively.

The thus obtained polymers A to C all had a solubility in water of not more than 1 g when the polymer neutralized 100% was dried to constant weight at 105° C. for 2 h, and then dissolved in 100 g of water at 25° C.

Production Example 4 (Production of Water-Soluble Polymer D)

A four-necked flask as a reaction vessel was charged with 224.5 g of ion-exchanged water, and an inside atmosphere of the flask was deaerated and then replaced with nitrogen atmosphere. Then, 4.4 g of ammonium peroxodisulfate was dissolved in 90 g of ion-exchanged water to prepare an initiator aqueous solution (1), and 10.2 g of 3-mercapto propionic acid was dissolved in 80 g of ion-exchanged water to prepare a chain transfer agent aqueous solution. The contents of the reaction vessel were heated to 80° C., and a monomer solution containing 280 g of hydroxyethyl acrylate (HEA), the initiator aqueous solution (1) and the chain transfer agent aqueous solution were added dropwise into the reaction vessel at the same time over 90 min. Thereafter, an initiator aqueous solution (2) prepared by dissolving 0.6 g of ammonium peroxodisulfate in 10 g of ion-exchanged water was added dropwise into the reaction vessel over 30 min, and the contents of the reaction vessel were further reacted at 80° C. for 60 min. After completion of the reaction, the obtained reaction solution was cooled to a normal temperature and neutralized with a 48% sodium hydroxide aqueous solution while stirring, thereby obtaining a polymer solution of a polymer D (weight average molecular weight: 14,200) having a solid content of 41% by mass and a pH of 5.

TABLE 1

|  | Production Example 1 (Polymer A) | | | Production Example 2 (Polymer B) | | | Production Example 3 (Polymer C) | | |
| --- | --- | --- | --- | --- | --- | --- | --- | --- | --- |
|  | Reaction vessel Initially charged monomer solution | Dropping funnel 1 Dropping monomer solution 1 | Dropping funnel 2 Dropping monomer solution 2 | Reaction vessel Initially charged monomer solution | Dropping funnel 1 Dropping monomer solution 1 | Dropping funnel 2 Dropping monomer solution 2 | Reaction vessel Initially charged monomer solution | Dropping funnel 1 Dropping monomer solution 1 | Dropping funnel 2 Dropping monomer solution 2 |
| Monomer composition (active ingredients) (part(s)) | | | | | | | | | |
| (c) Benzyl acrylate | 24 | 129.6 | 86.4 | 13 | 70.2 | 46.8 | 10 | 80 | 10 |
| (b) Styrene macromer*[1] | 0 | 0 | 0 | 0 | 0 | 0 | 5 | 60 | 7.5 |
| (a) Methacrylic acid | 0 | 0 | 0 | 0 | 0 | 0 | 0 | 40 | 10 |
| (a) Acrylic acid | 6 | 32.4 | 21.6 | 5.2 | 28.08 | 18.72 | 0 | 0 | 0 |
| (e) NK Ester EH4E*[2] | 0 | 0 | 0 | 7.8 | 42.12 | 28.08 | 5 | 45 | 0 |
| Organic solvent (part(s)) | | | | | | | | | |
| MEK | 36.9 | 199.26 | 132.84 | 24.18 | 130.56 | 87.04 | 26.875 | 55.625 | 55 |
| Polymerization initiator (part(s)) | | | | | | | | | |
| V-65*[3] | 0 | 1.8 | 1.2 | 0 | 1.56 | 1.04 | 0 | 2 | 0.5 |
| Chain transfer agent (part(s)) | | | | | | | | | |
| 2-Mercaptoethanol | 0.105 | 0.57 | 0.38 | 0.091 | 0.492 | 0.328 | 0.075 | 0.525 | 0.15 |
| Weight-average molecular weight of resulting water-insoluble polymer | | 72,000 | | | 75,000 | | | 62,000 | |

Note
*[1]"AS-6S" (tradename) available from Toagosei Co., Ltd.; number-average molecular weight: 6000; segment: styrene-acrylonitrile; toluene solution; solid content: 51%.
*[2]2-Ethylhexyl polyethylene glycol monomethacrylate "EH4E" (tradename) available from Shin-Nakamura Kagak Kogyo Co., Ltd. (average molar number of addition of ethyleneoxide: 4; terminal end: 2-ethylhexyl group)
*[3]2,2'-Azobis(2,4-dimethyl valeronitrile) "V-65" (tradename) available from Wako Pure Chemical Industries, Ltd.

Example 1

Preparation of Water Dispersion of Pigment-Containing Polymer Particles

[Step (I)]

Forty three (43) parts of the dried polymer obtained in Production Example 1 were dissolved in 150 parts of methyl ethyl ketone. Added into the resulting solution were 23.6 parts of a 5N sodium hydroxide aqueous solution as a neutralizing agent and 663 parts of ion-exchanged water, and then 100 parts of a diazo pigment ("C.I. Pigment Yellow 74" available from Sanyo Color Works, Ltd.) was further added to the resulting mixed solution to obtain a mixture containing the polymer, methyl ethyl ketone, pigment and water. The degree of neutralization of the resulting mixture solution was 100 mol %.

[Step (II)]

The thus obtained mixture was mixed at 20° C. for 1 h using a disper blade at 8000 rpm. The resulting dispersion was subjected to dispersion treatment by a circulation method using a media disperser ("Ultra Apex Mill" (Model UAM-1) available from Kotobuki Industries Co., Ltd.) packed with 0.05 mind) zirconia beads as dispersing media particles ("YTZ Ball" available from Nikkato Corporation; dispersing media particles produced by granulation method) (beads packing rate: 80%) at an agitation blade peripheral speed of 12 m/s and a circulation flow rate of 500 mL/min for 2 h. The zirconia beads used in the dispersion treatment had such a use history that the degree of abrasion (in terms of a cumulative net power as measured by operating the disperser packed with the dispersing media particles) was as shown in Table 2.

Next, in order to further ensure good dispersion stability, the resulting dispersion was subjected to dispersion treatment by a high-pressure dispersion method under a pressure of 150 MPa using a Microfluidizer (high-pressure disperser available from Microfluidics Corp.) by passing through the disperser 5 times, thereby obtaining a mixture of a dispersion of the pigment-containing polymer particles.

[Step (III)]

The obtained dispersion mixture (solid content: 15%) was placed in an evaporator at 60° C. under reduced pressure to remove methyl ethyl ketone therefrom, followed by further removing a part of water therefrom to concentrate the dispersion until reaching a solid content of 25%, thereby obtaining a water dispersion of the pigment-containing polymer particles.

[Step (IV)]

Next, the resulting water dispersion was subjected to centrifugal separation using a non-porous wall basket-type centrifugal separator ("himac CR7" available from Hitachi Koki Co., Ltd.; radius: 11.2 cm) at a temperature set to 20° C. at a rotating speed of 2300 rpm (1500 G) for 20 min to remove coarse particles therefrom, and water was further added to the dispersion, thereby obtaining a water dispersion for ink-jet printing having a solid content of 20% and containing the pigment-containing polymer particles. The average particle size of the pigment-containing vinyl polymer particles in the resulting water dispersion was 98 nm.

<Production of Water-Based Ink>

[Step (V)]

The above prepared water dispersion for ink-jet printing containing the pigment-containing vinyl polymer particles (solid content: 20%), glycerol and "SURFYNOL 465" (available from Nissin Chemical Industry Co., Ltd.) were mixed in amounts of 28.6 parts, 15 parts and 1 part, respectively, and ion-exchanged water was further added and mixed in the obtained mixture to adjust a total amount of the mixture to 100 parts. The resulting mixed solution was filtered by passing through a filter "Minisart Syringe Filter"

(available from Sartorius Inc.; pore diameter: 1.2 µm; material: cellulose acetate), thereby obtaining a water-based ink for ink-jet printing.

The thus obtained water-based ink was subjected to the above evaluation procedures. The results are shown in Table 2.

Examples 2 to 5 and 7

The same procedure as in Example 1 was repeated except that upon preparing the water dispersion of the pigment-containing polymer particles, the abraded zirconia beads having the use history represented by such a cumulative net power as shown in Table 2 were used as the dispersing media particles, thereby obtaining water-based inks. Meanwhile, the average particle sizes of the pigment-containing vinyl polymer particles contained in the respective water dispersions of the pigment-containing polymer particles are shown in Table 2.

The thus obtained water-based inks were subjected to the above evaluation procedures. The results are shown in Table 2.

Example 6

The same procedure as in Example 2 was repeated except that upon preparing the water dispersion of the pigment-containing polymer particles, the abraded zirconia beads having the use history represented by such a cumulative net power as shown in Table 2 were used as the dispersing media particles, and in the dispersing step of Example 2, the dispersion obtained after the dispersing step using the media disperser was subjected to no dispersion treatment using the high-pressure disperser, thereby obtaining a water-based ink. Meanwhile, the average particle size of the pigment-containing vinyl polymer particles contained in the water dispersion of the pigment-containing polymer particles was 101 nm.

The thus obtained water-based ink was subjected to the above evaluation procedures. The results are shown in Table 2.

Comparative Example 1

The same procedure as in Example 1 was repeated except that in the dispersing step of Example 1, the Microfluidizer (high-pressure disperser available from Microfluidics Corp.) was used in place of the media disperser, and the dispersion treatment was conducted using the disperser by a high-pressure dispersion method under a pressure of 150 MPa by passing through the disperser 15 times, thereby obtaining a water dispersion of pigment-containing vinyl polymer particles. The average particle size of the pigment-containing vinyl polymer particles contained in the resulting water dispersion was 120 nm.

The above prepared water dispersion of the pigment-containing vinyl polymer particles (solid content: 20%), glycerol, "SURFYNOL 465" (available from Nissin Chemical Industry Co., Ltd.) and zirconium carbonate (available from Sigma-Aldrich Corporation) were mixed in amounts of 28.6 parts, 15 parts, 1 part and 0.005 part, respectively, and ion-exchanged water was further added and mixed in the obtained mixture to adjust a total amount of the mixture to 100 parts. The resulting mixed solution was filtered by passing through a filter "Minisart Syringe Filter" (tradename; available from Sartorius Inc.; pore diameter: 1.2 µm; material: cellulose acetate), thereby obtaining a water-based ink.

The thus obtained water-based ink was subjected to the above evaluation procedures. The results are shown in Table 2.

Comparative Example 2

The same procedure as in Comparative Example 1 was repeated except that no zirconium carbonate was added to the water dispersion of the pigment-containing vinyl polymer particles, thereby obtaining a water-based ink.

The thus obtained water-based ink was subjected to the above evaluation procedures. The results are shown in Table 2.

Comparative Example 3

The same procedure as in Comparative Example 1 was repeated except that 0.006 part of zirconium oxide ("Zirconium (IV) Oxide; particle size: 100 nm" available from Sigma-Aldrich Corporation) was used and added in place of the zirconium carbonate (available from Sigma-Aldrich Corporation), thereby obtaining a water-based ink.

The thus obtained water-based ink was subjected to the above evaluation procedures. The results are shown in Table 2.

TABLE 2

| | Method of introducing zirconia | Average particle size of pigment-containing polymer particles (nm) | Degree of abrasion of dispersing media particles (zirconia beads) used | | | Dispersion treatment using high-pressure disperser | Concentration of Zr in ink (ppm) | Presence or absence of solid zirconium compound | Evaluation of corrosion (amount of silicon nitride film reduced) | |
| | | | Net power (kw/kg) | Cumulative time (h) | Cumulative power (kwh/kg) | | | | After 2 days (Å) | After 7 days (Å) |
| --- | --- | --- | --- | --- | --- | --- | --- | --- | --- | --- |
| Example 1 | Step (II) | 98 | 0.6 | 3250 | 1950 | Done | 52 | Presence | 420 | 1112 |
| Example 2 | Step (II) | 94 | 0.6 | 2700 | 1620 | Done | 8 | Presence | 497 | 1245 |
| Example 3 | Step (II) | 95 | 0.6 | 3000 | 1800 | Done | 20 | Presence | 426 | 1189 |
| Example 4 | Step (II) | 98 | 0.6 | 4050 | 2430 | Done | 167 | Presence | 415 | 1198 |
| Example 5 | Step (II) | 99 | 0.6 | 3800 | 2280 | Done | 101 | Presence | 451 | 1210 |
| Example 6 | Step (II) | 101 | 0.6 | 3260 | 1956 | None | 54 | Presence | 433 | 1099 |
| Example 7 | Step (II) | 95 | 0.6 | 2000 | 1200 | Done | 3 | Presence | 515 | 1897 |
| Comparative Example 1 | Step (V) | 120 | — | — | — | Done | 50 | Absence | 444 | 2512 |
| Comparative Example 2 | — | 114 | — | — | — | Done | 0 | — | 1218 | 4048 |

TABLE 2-continued

| | | Average particle size of pigment-containing polymer particles (nm) | Degree of abrasion of dispersing media particles (zirconia beads) used | | | Dispersion treatment using high-pressure disperser | Concentration of Zr in ink (ppm) | Presence or absence of solid zirconium compound | Evaluation of corrosion (amount of silicon nitride film reduced) | |
|---|---|---|---|---|---|---|---|---|---|---|
| | Method of introducing zirconia | | Net power (kw/kg) | Cumulative time (h) | Cumulative power (kwh/kg) | | | | After 2 days (Å) | After 7 days (Å) |
| Comparative Example 3 | Step (V) | 116 | — | — | — | Done | 61 | Presence | 485 | 2254 |

From Table 2, it was confirmed that the water-based inks obtained in Examples 1 to 7 were excellent in effect of suppressing corrosion of silicon nitride for a long period of time as compared to the water-based inks obtained in Comparative Examples 1 to 3.

Examples 8 to 10

The same procedure as in Example 1 was repeated except that upon preparing the water dispersion of the pigment-containing polymer particles, the pigment was replaced with carbon black ("NIPEX160IQ" available from Evonik Degussa Japan Co., Ltd.), thereby obtaining water-based inks. Meanwhile, the average particle sizes of the pigment-containing vinyl polymer particles contained in the water dispersions of the pigment-containing polymer particles are shown in Table 3.

The thus obtained water-based inks were subjected to the above evaluation procedures. The results are shown in Table 3.

Example 11

A pigment dispersion was prepared by mixing 22.5 parts of carbon black ("SDP-100" available from Sensient Technologies Corporation; solid content: 13.6%) as a self-dispersible pigment, and 2.4 parts of the polymer D produced in Production Example 4. The resulting dispersion was subjected to dispersion treatment by a circulation method using a media disperser ("Ultra Apex Mill" (Model UAM-0.5) available from Kotobuki Industries Co., Ltd.) packed with 0.05 mmϕ zirconia beads as dispersing media particles ("YTZ Ball" available from Nikkato Corporation; dispersing media particles produced by granulation method) (beads packing rate: 80%) at an agitation blade peripheral speed of 12 m/s and a circulation flow rate of 250 mL/min for 1 h.

Thereafter, 15 parts of glycerol and 1 part of "SURFYNOL 465" (available from Nissin Chemical Industry Co., Ltd.) were added to a whole amount of the thus obtained treated solution, and the resulting mixture was appropriately treated with sodium hydroxide to control the pH of the ink solution to 9. Then, ion-exchanged water was further added to the obtained mixture to adjust a total amount of the mixture to 100 parts. The resulting mixed solution was filtered by passing through a filter "Minisart Syringe Filter" (tradename; available from Sartorius Inc.; pore diameter: 1.2 μm; material: cellulose acetate), thereby obtaining a water-based ink.

The thus obtained water-based ink was subjected to the above evaluation procedures. The results are shown in Table 3.

Comparative Example 4

The same procedure as in Example 11 was repeated except that in the ink preparation step of Example 11, no polymer D was added, thereby obtaining a water-based ink.

The thus obtained water-based ink was subjected to the above evaluation procedures. The results are shown in Table 3.

TABLE 3

| | | Pigment-containing polymer particles | | | | | Evaluation of corrosion (amount of silicon nitride film reduced) | | Dispersion stability (rate of change in average particle size; %) |
|---|---|---|---|---|---|---|---|---|---|
| | Method of introducing zirconia | Polymer | Pigment | Average particle size (nm) | Concentration of Zr in ink (ppm) | After 2 days (Å) | After 7 days (Å) | |
| Example 1 | Step (II) | Polymer A | Water-insoluble | Yellow | 98 | 52 | 420 | 1112 | 109 |
| Example 8 | Step (II) | Polymer A | Water-insoluble | Carbon black | 79 | 49 | 512 | 1356 | 102 |
| Example 9 | Step (II) | Polymer B | Water-insoluble | Carbon black | 83 | 71 | 425 | 1456 | 100 |
| Example 10 | Step (II) | Polymer C | Water-insoluble | Carbon black | 81 | 58 | 427 | 1385 | 105 |
| Example 11 | Step (II) | Polymer D | Water-insoluble | Self-dispersible carbon black | 125 | 49 | 444 | 1816 | 125 |
| Comparative Example 4 | Step (II) | — | — | Self-dispersible carbon black | 123 | 56 | 897 | 3489 | 138 |

From Table 3, it was confirmed that the water-based inks obtained in Examples 1 and 8 to 11 were excellent in effect of suppressing corrosion of silicon nitride for a long period of time and dispersion stability as compared to the water-based ink obtained in Comparative Example 4.

INDUSTRIAL APPLICABILITY

The water-based ink for ink-jet printing obtained by the production process of the present invention has an excellent effect of suppressing corrosion of inside materials of an ink-jet printer such as a print head, for a long period of time, and therefore can be suitably used in an ink-jet printer with high economy.

The invention claimed is:

1. A process for producing a water-based ink for ink-jet printing, comprising the step of dispersing a pigment in a polymer by means of a disperser using dispersing media particles comprising a zirconium compound to introduce a solid zirconium compound into the water-based ink, the water-based ink comprising the pigment-containing polymer particles and the solid zirconium compound, and having a zirconium compound content of not less than 2 ppm and not more than 200 ppm in terms of a concentration of zirconium in the water-based ink,
wherein the process comprises the following steps (I) to (V) in which the step of introducing the solid zirconium compound into the water-based ink is conducted in the step (II):
step (I): preparing a mixture comprising the polymer, an organic solvent, the pigment and water;
step (II): subjecting the mixture obtained in the step (I) to dispersing treatment using the dispersing media particles comprising the zirconium compound to obtain a dispersion of the pigment-containing polymer particles;
step (III): removing the organic solvent from the dispersion of the pigment-containing polymer particles obtained in the step (II) to obtain a water dispersion of the pigment-containing polymer particles;
step (IV): removing coarse particles from the water dispersion obtained in the step (III) to obtain a water dispersion for ink-jet printing; and
step (V): preparing the water-based ink for ink-jet printing using the water dispersion obtained in the step (IV),
wherein a use history of the dispersing media particles is controlled such that a cumulative net power as measured by operating the disperser packed with the dispersing media particles is not less than 1500 kwh/kg and
wherein a packing rate of the dispersing media particles in the disperser in the step (II) is not less than 50% and not more than 95%.

2. The process for producing a water-based ink for ink-jet printing according to claim 1, wherein the polymer is a water-insoluble polymer having a solubility in water of not more than 10 g as measured by dissolving the polymer in 100 g of water at 25° C.

3. The process for producing a water-based ink for ink-jet printing according to claim 2, wherein the water-insoluble polymer is at least one polymer selected from the group consisting of vinyl-based polymers, polyesters and polyurethanes.

4. The process for producing a water-based ink for ink-jet printing according to claim 2, wherein the water-insoluble polymer is the vinyl-based polymer comprising a constitutional unit derived from a (meth)acrylic acid ester.

5. The process for producing a water-based ink for ink-jet printing according to claim 1, wherein the zirconium compound is at least one compound selected from the group consisting of zirconium, zirconia, zircon and a solid solution of any of these compounds with a rare earth oxide.

6. The process for producing a water-based ink for ink-jet printing according to claim 1, wherein the solid zirconium compound used in the water-based ink has a particle size that allows the solid zirconium compound to pass through a filter having a pore diameter of 1.2 μm.

7. The process for producing a water-based ink for ink-jet printing according to claim 1, wherein the water-based ink is used in an ink-jet printer comprising a print head an inside portion of which is made of an inorganic material.

8. The process for producing a water-based ink for ink-jet printing according to claim 7, wherein the inorganic material comprises silicon nitride.

9. The process for producing a water-based ink for ink-jet printing according to claim 1, wherein the pigment-containing polymer particles have an average particle size of not less than 40 nm and not more than 300 nm.

10. The process for producing a water-based ink for ink-jet printing according to claim 1, wherein a use history of the dispersing media particles is controlled such that a cumulative net power as measured by operating the disperser packed with the dispersing media particles is not less than 1900 kwh/kg.

11. An image forming method comprising the step of using the water-based ink for ink-jet printing produced by the process according to claim 1 in an ink-jet printer comprising a print head an inside portion of which is made of an inorganic material to form images.

12. A method of storing a water-based ink for ink-jet printing, comprising the step of storing the water-based ink for ink-jet printing produced by the process according to claim 1 in an apparatus an inside portion of which is made of an inorganic material.

13. A method of preventing corrosion of an inorganic material, using the water-based ink for ink-jet printing produced by the process according to claim 1.

14. The method according to claim 11, wherein the inorganic material comprises silicon nitride.

15. The process for producing a water-based ink for ink-jet printing according to claim 1, wherein a use history of the dispersing media particles is controlled such that a cumulative net power as measured by operating the disperser packed with the dispersing media particles is not more than 10000 kwh/kg.

16. The process for producing a water-based ink for ink-jet printing according claim 1, wherein a zirconium compound content is not less than 20 ppm, in terms of a concentration of zirconium in the water-based ink.

17. The process for producing a water-based ink for ink-jet printing according claim 1, wherein a zirconium compound content is not more than 150 ppm, in terms of a concentration of zirconium in the water-based ink.

18. The method according to claim 12, wherein the inorganic material comprises silicon nitride.

19. The method according to claim 13, wherein the inorganic material comprises silicon nitride.

* * * * *